US011797964B2

(12) United States Patent
Vankirk et al.

(10) Patent No.: US 11,797,964 B2
(45) Date of Patent: Oct. 24, 2023

(54) AUTOMATED TRANSACTION MACHINE

(71) Applicant: Diebold Nixdorf, Incorporated, North Canton, OH (US)

(72) Inventors: Thomas A. Vankirk, Medina, OH (US); Chris Rowe, Copley, OH (US); Damon J. Blackford, Akron, OH (US); Dave Kraft, Uniontown, OH (US); Nathaniel Oberly, East Canton, OH (US); Robert Michael Cole, New Franklin, OH (US); Todd Christian, Dalton, OH (US); Andrea Carozzi, Delbrueck (DE); Erich Kujat, Paderborn (DE); Jochen Linck, Essen (DE); Michael J. Harty, Canton, OH (US); Aaron C. Graham, Mogadore, OH (US); Bohdan Kurylak, Paderborn (DE); Christoph Brücher, Salzkotten (DE); Kyle Mann, North Canton, OH (US)

(73) Assignee: Diebold Nixdorf, Incorporated, Hudson, OH (US)

( * ) Notice: Subject to any disclaimer, the term of this patent is extended or adjusted under 35 U.S.C. 154(b) by 329 days.

(21) Appl. No.: 17/332,296

(22) Filed: May 27, 2021

(65) Prior Publication Data
US 2021/0295296 A1    Sep. 23, 2021

Related U.S. Application Data

(63) Continuation of application No. PCT/US2020/039590, filed on Jun. 25, 2020.
(Continued)

(51) Int. Cl.
*G06Q 20/20* (2012.01)
*G07D 11/40* (2019.01)
(Continued)

(52) U.S. Cl.
CPC ....... *G06Q 20/204* (2013.01); *G06K 7/10415* (2013.01); *G06Q 20/042* (2013.01);
(Continued)

(58) Field of Classification Search
CPC ............... G06Q 20/204; G06Q 20/042; G06Q 20/1085; G06Q 20/209; G06Q 40/02;
(Continued)

(56) References Cited

U.S. PATENT DOCUMENTS 6,010,065 A * 1/2000 Ramachandran ....... G07F 19/20
235/379
6,082,616 A * 7/2000 Lewis ................... G07F 19/201
235/379

(Continued)

FOREIGN PATENT DOCUMENTS

WO    2000/053871 A1    9/2000

OTHER PUBLICATIONS

International Search Report filed in the corresponding PCT Application dated Aug. 24, 2020; 2 pages.
(Continued)

*Primary Examiner* — A. Hunter Wilder
*Assistant Examiner* — Joseph M Mutschler
(74) *Attorney, Agent, or Firm* — Black McCuskey

(57) ABSTRACT

An automated transaction machine (ATM) can include a housing, a display, a cash recycler, and a check receiver. The display can be mounted to the housing and directed toward an exterior of the housing. The cash recycler can be configured to receive a first note of currency from a first user of the ATM and dispense the first note of currency to a subsequent, second user of the ATM. The check receiver can be positioned in the housing, an intake portion with an inlet communicating with the exterior of the housing, and a check reader portion configured to receive a check from the intake
(Continued)

portion, scan data displayed on the check, and store the check. The intake portion can be positioned below the display and the check reader portion is positioned behind the display.

8 Claims, 22 Drawing Sheets

Related U.S. Application Data

(60) Provisional application No. 62/866,273, filed on Jun. 25, 2019.

(51) Int. Cl.
| | |
|---|---|
| *G06K 7/10* | (2006.01) |
| *G06Q 20/04* | (2012.01) |
| *G06Q 20/10* | (2012.01) |
| *G06Q 40/02* | (2023.01) |
| *G07F 19/00* | (2006.01) |

(52) U.S. Cl.
CPC ....... *G06Q 20/1085* (2013.01); *G06Q 20/209* (2013.01); *G06Q 40/02* (2013.01); *G07D 11/40* (2019.01); *G07F 19/202* (2013.01); *G07F 19/203* (2013.01); *G07F 19/205* (2013.01)

(58) Field of Classification Search
CPC .. G07D 11/40; G06K 7/10415; G07F 19/201; G07F 19/202; G07F 19/203; G07F 19/205
See application file for complete search history.

(56) References Cited

U.S. PATENT DOCUMENTS

| | | | | |
|---|---|---|---|---|
| 6,302,393 | B1* | 10/2001 | Beskitt | G07F 19/202 271/258.01 |
| 8,052,051 | B1* | 11/2011 | Lute | G07F 19/20 235/375 |
| 2004/0200894 | A1* | 10/2004 | Ramachandran | G07F 19/201 235/379 |
| 2009/0188973 | A1* | 7/2009 | Coventry | G07F 19/20 235/379 |
| 2012/0168499 | A1* | 7/2012 | Douglass | G07F 19/00 235/379 |
| 2015/0100489 | A1* | 4/2015 | Graef | G06Q 20/1085 705/43 |
| 2016/0125374 | A1* | 5/2016 | Smith | G07D 11/009 705/43 |

OTHER PUBLICATIONS

Written Opinion filed in the corresponding PCT Application dated Aug. 24, 2020; 7 pages.

* cited by examiner

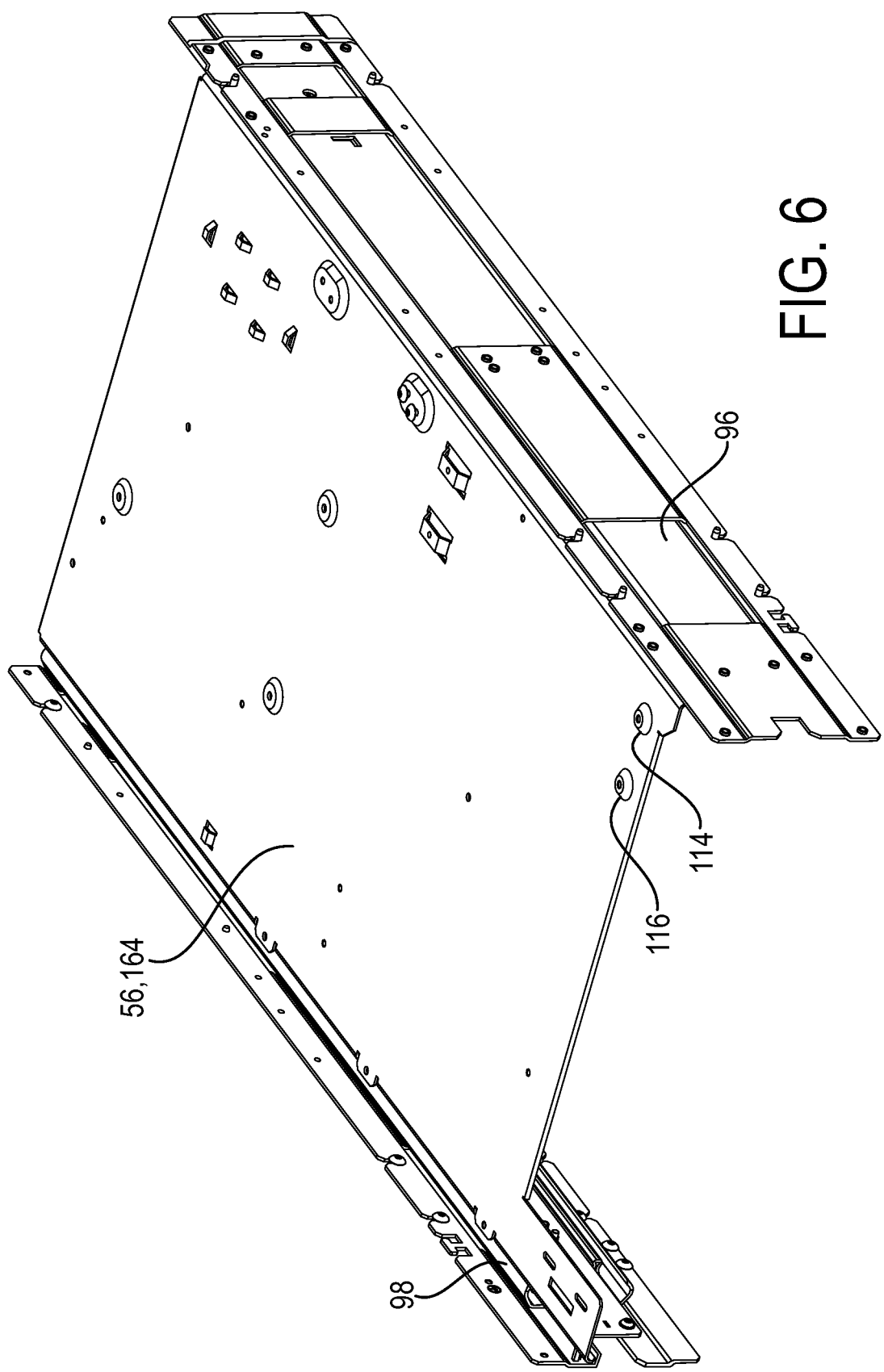

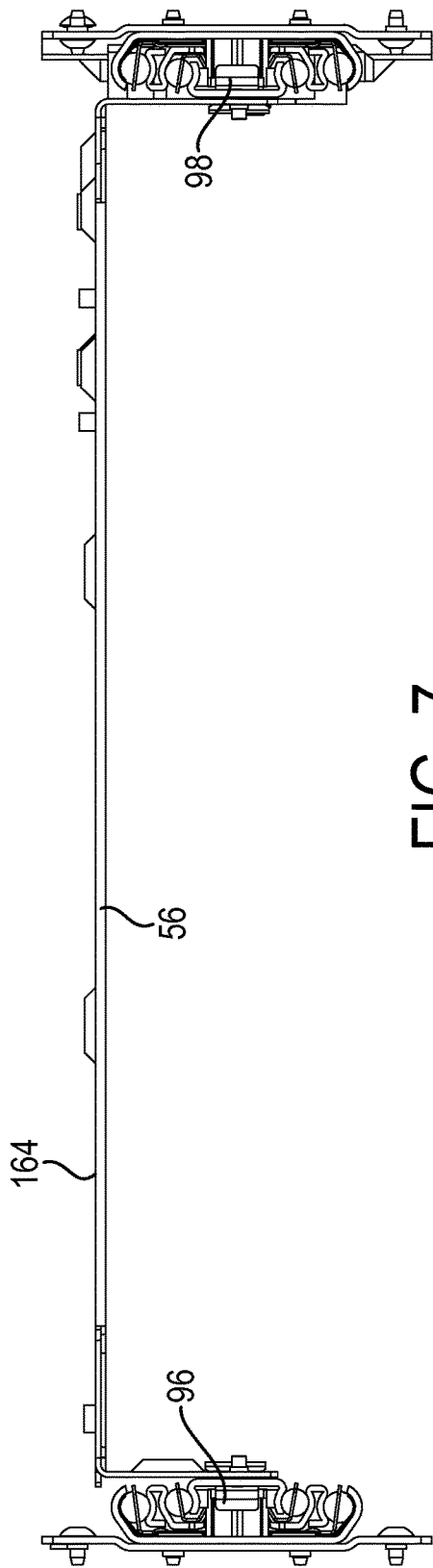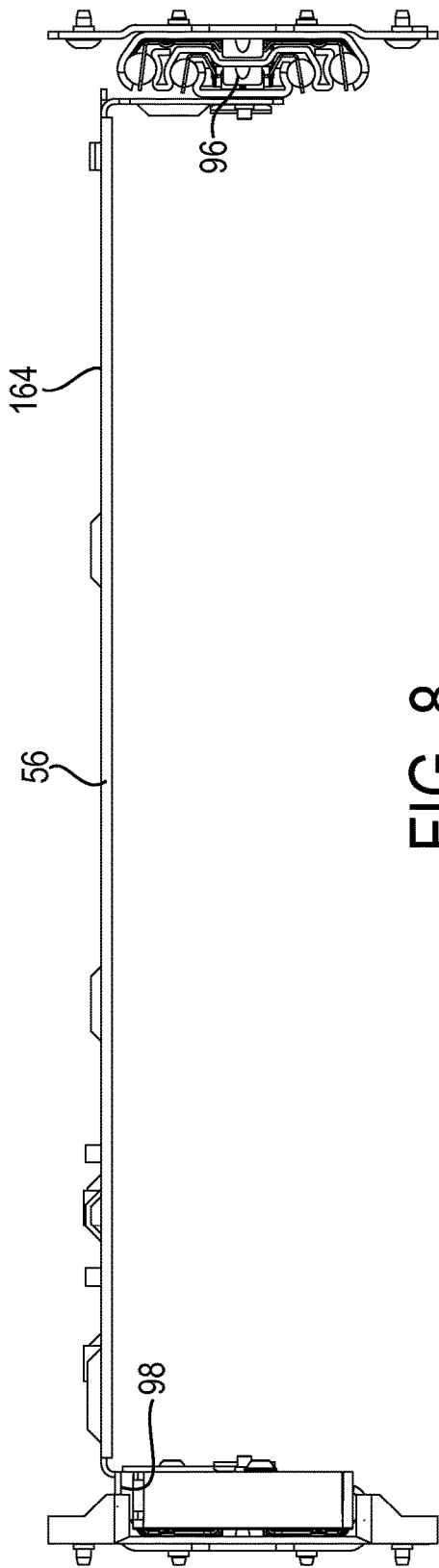

AUTOMATED TRANSACTION MACHINE

CROSS-REFERENCE TO RELATED APPLICATIONS

This application is a CONTINUATION of PCT/US20/39590 (published as WO2020264142) for an AUTOMATED TRANSACTION MACHINE, filed on Jun. 25, 2020, and also claims the benefit of U.S. Provisional Patent Application Ser. No. 62/866,273 for an AUTOMATED TRANSACTION MACHINE, filed on Jun. 25, 2019, which are hereby incorporated by reference in their entireties.

BACKGROUND

1. Field

The present disclosure relates to Automated Transaction Machines (ATMs), alternatively referred to as Automated Banking Machines or Automated Teller Machines.

2. Description of Related Prior Art

ATMs are commonly used to carry out a variety of financial or commercial transactions. Most commonly, these transactions include dispensing cash, checking account balances, paying bills and/or receiving deposits from users. ATMs may also perform a variety of other transactions, including the sale and purchase of tickets, issuance of coupons, check or voucher presentation, the printing of script and a variety of other functions. In carrying out these transactions or performing these functions, a variety of documents may be moved through the ATM.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An automated transaction machine (ATM) can include a housing, a display, a cash recycler, and a check receiver. The housing can define a depth between a forward side and an aft side along a longitudinal horizontal axis, a width between a right side and a left side along a lateral horizontal axis, and a height between a bottom edge and a top edge along a longitudinal vertical axis. The display can be mounted to the housing and directed toward an exterior of the housing. The cash recycler can be configured to receive a first note of currency from a first user of the ATM and dispense the first note of currency to a subsequent, second user of the ATM. The check receiver can be positioned in the housing. The check receiver can have an intake portion with an inlet communicating with the exterior of the housing. The check receiver can also have a check reader portion configured to receive a check from the intake portion, scan data displayed on the check, and store the check. The intake portion can be positioned below the display and the check reader portion is positioned behind the display.

According to other features, the cash recycler can be further defined as including a head portion and a base portion. The housing can be further defined as including an upper portion and a lower portion. The head portion of the cash recycler and the check receiver and the display can be positioned in the upper portion of the housing, and the base portion of the cash recycler positioned in the lower portion of the housing. The ATM can further comprise a safe positioned in the lower portion of the housing and containing the base portion of the cash recycler. The safe can include an aperture through which the head portion and the base portion exchange currency between each other.

In other features, the ATM can also include a tray mounted in the housing. The check receiver can be positioned on the tray. The ATM can also include first and second telescopic tracks interconnecting the tray and the housing. The check receiver can be moveable in and out of the housing on the tray along the longitudinal horizontal axis. The ATM can also include a fascia mounted to the housing for pivoting movement about a pivot axis parallel to the lateral horizontal axis. The fascia can be moveable between a first position in which the fascia cooperates with the housing to enclose the tray and the check receiver and a second position pivotally spaced from the first position. The check receiver can be pulled out of the housing along the longitudinal horizontal axis while supported on the first and second telescopic tracks when the fascia is in the second position.

According to additional features, the ATM can also include third and fourth telescopic tracks interconnecting at least part of the cash recycler and the housing. The at least part of the cash recycler can be moveable in and out of the housing along the longitudinal horizontal axis. The ATM can also include a card reader having an inlet and positioned on the tray next to the card receiver. The ATM can also include a first bezel defining a passageway for a card and mounted in the fascia. The passageway can extend between an inlet and an outlet. The outlet of the first bezel can be aligned with the inlet of the card reader when the fascia is in the first position. One of the first bezel and the card reader can further comprise at least one bar extending parallel to and spaced from the inlet of the card reader when the fascia is in the first position. The other of the first bezel and the card reader can further comprise at least one latch at least partially surrounding the at least one bar when the fascia is in the first position. The at least one bar and the at least one latch can come into engagement with one another as the fascia is moving to the first position from the second position. The at least one bar and the at least one latch cooperate to lift the card reader while coming into engagement with one another.

According to other features, the ATM can also include a second bezel defining a passageway for a check and mounted in the fascia. The passageway can extend between an inlet and an outlet. The outlet of the second bezel can align with the inlet of the check receiver when the fascia is in the first position. The second bezel can include a door movable to selectively close the passageway of the second bezel. One of the second bezel and the intake portion of the check receiver can further comprise at least one bar extending parallel to and spaced from the inlet of the check receiver when the fascia is in the first position. The other of the second bezel and the intake portion of the check receiver can further comprise at least one latch at least partially surrounding the at least one bar when the fascia is in the first position. The at least one bar and the at least one latch can come into engagement with one another as the fascia is moving to the first position from the second position. The at least one bar and the at least one latch can cooperate to pivot the intake portion of the check receiver relative to the check reader portion of the check receiver while coming into engagement with one another.

In other features, the ATM can include a first bezel defining a passageway for a card and mounted in the fascia. The passageway can extend between an inlet and an outlet. The outlet of the first bezel can align with the inlet of the card reader when the fascia is in the first position. One of the first bezel and the card reader can further comprise at least one first bar extending parallel to and spaced from the inlet of the card reader when the fascia is in the first position. The other of the first bezel and the card reader can further comprise at least one first latch at least partially surrounding the at least one first bar when the fascia is in the first position. The at least one first bar and the at least one first latch can come into engagement with one another as the fascia is moving to the first position from the second position. The at least one first bar and the at least one first latch cooperate to lift the card reader while coming into engagement with one another. The ATM can include a second bezel defining a passageway for a check and mounted in the fascia. The passageway can extend between an inlet and an outlet. The outlet of the second bezel can be aligned with the inlet of the check receiver when the fascia is in the first position. One of the second bezel and the check receiver can further comprise at least one second bar extending parallel to and spaced from the inlet of the check receiver when the fascia is in the first position. The other of the second bezel and the check receiver can further comprise at least one second latch at least partially surrounding the at least one second bar when the fascia is in the first position. The at least one second bar and the at least one second latch can come into engagement with one another as the fascia is moving to the first position from the second position. The at least one second bar and the at least one second latch can cooperate to pivot at least a portion of the check receiver relative to the tray while coming into engagement with one another. The at least one first bar and the at least one first latch can engage one another at a first height elevated from the tray when the fascia is in the first position. The at least one second bar and the at least one second latch can engage one another at a second height elevated from the tray when the fascia is in the first position. The first height and the second height can be different from one another.

According to additional features, the display can be mounted in the fascia and thereby moveable with the fascia as the fascia moves between the first position and the second position. The display can further comprise a display side through which information is displayed, a rear side opposite to the display side, and a plurality of lateral sides extending between the display side and the rear side. At least one of the card reader and the intake portion of the check receiver can be directly below a lateral side of the plurality of lateral sides of the display that is rearward-least along the longitudinal horizontal axis when the fascia is in the first position. The card reader and the intake portion of the check receiver can both be directly below the lateral side of the plurality of lateral sides of the display that is rearward-least longitudinal horizontal axis when the fascia is in the first position.

According to other features, the first and second telescopic tracks can be below the card reader and the check receiver along the longitudinal vertical axis. The first and second telescopic tracks and the third and fourth telescopic tracks can be laterally adjacent to the cash recycler along the lateral horizontal axis. The check reader portion of the check receiver can rest on the tray and the intake portion can be pivotally mounted to the check reader portion.

In other features, the ATM can include a tray mounted in the housing. The ATM can include a card reader having an inlet and positioned on the tray. The ATM can include a receipt printer having an outlet and positioned on the tray. The ATM can include a fascia mounted to the housing for pivoting movement about a pivot axis parallel to the lateral horizontal axis. The fascia can be moveable between a first position in which the fascia cooperates with the housing to enclose the tray, the card reader, the check receiver and the receipt printer and a second position pivotally spaced from the first position wherein the tray can be pulled out of the housing along the longitudinal horizontal axis while supported on the first and second telescopic tracks when the fascia is in the second position. The ATM can include first and second telescopic tracks interconnecting the tray and the housing, wherein the card reader, the check receiver and the receipt printer are jointly moveable in and out of the housing on the tray along the longitudinal horizontal axis.

According to additional features, at least one of the card reader, the check receiver, and the receipt printer can include a downwardly-facing surface that contacts an upwardly-facing surface defined by the tray and extends laterally beyond a lateral edge of the upwardly-facing surface. At least two of the card reader, the check receiver, and the receipt printer can extend laterally beyond the upwardly-facing surface defined by the tray and upon which the card reader, the check receiver, and the receipt printer rest.

According to other features, the ATM can also include a first bezel defining a passageway for a card and mounted in the fascia. The passageway can extend between an inlet and an outlet. The outlet of the first bezel can align with the inlet of the card reader when the fascia is in the first position. A first vertical plane can extend parallel to the lateral horizontal axis and the longitudinal vertical axis. The first vertical plane can extend through the first bezel and the card reader and the lateral side of the plurality of lateral sides of the display that is rearward-least along the longitudinal horizontal axis. The ATM can include a second bezel defining a passageway for a check and mounted in the fascia. The passageway can extend between an inlet and an outlet. The outlet of the second bezel can align with the inlet of the check receiver when the fascia is in the first position. A second vertical plane can extend parallel to the lateral horizontal axis and the longitudinal vertical axis. The second vertical plane can extend through the second bezel and the check receiver and the lateral side of the plurality of lateral sides of the display that is rearward-least along the longitudinal horizontal axis. The ATM can include a third bezel defining a passageway for a receipt and mounted in the fascia. The passageway can extend between an inlet and an outlet. The inlet of the third bezel can be aligned with the outlet of the receipt printer when the fascia is in the first position. A third vertical plane can extend parallel to the lateral horizontal axis and the longitudinal vertical axis. The third vertical plane can extend through the third bezel and the card reader and the lateral side of the plurality of lateral sides of the display that is rearward-least along the longitudinal horizontal axis.

In other features, the ATM can include a safe positioned in the housing below the tray. The cash recycler can include a head portion positioned between the safe and the tray and also include a base portion positioned in the safe. The safe can include an aperture through which currency is moved between the head portion and the base portion. All of the card reader, the check receiver, and the receipt printer can be directly below the lateral side of the plurality of lateral sides of the display that is rearward-least longitudinal horizontal axis when the fascia is in the first position.

BRIEF DESCRIPTION OF THE DRAWINGS

The detailed description set forth below references the following drawings:

FIG. 6 is a perspective view of the tray of the upper portion of the ATM;

FIG. 7 is a front view of the tray of the upper portion of the ATM;

FIG. 8 is a back view of the tray of the upper portion of the ATM;

DETAILED DESCRIPTION

Figure 1:
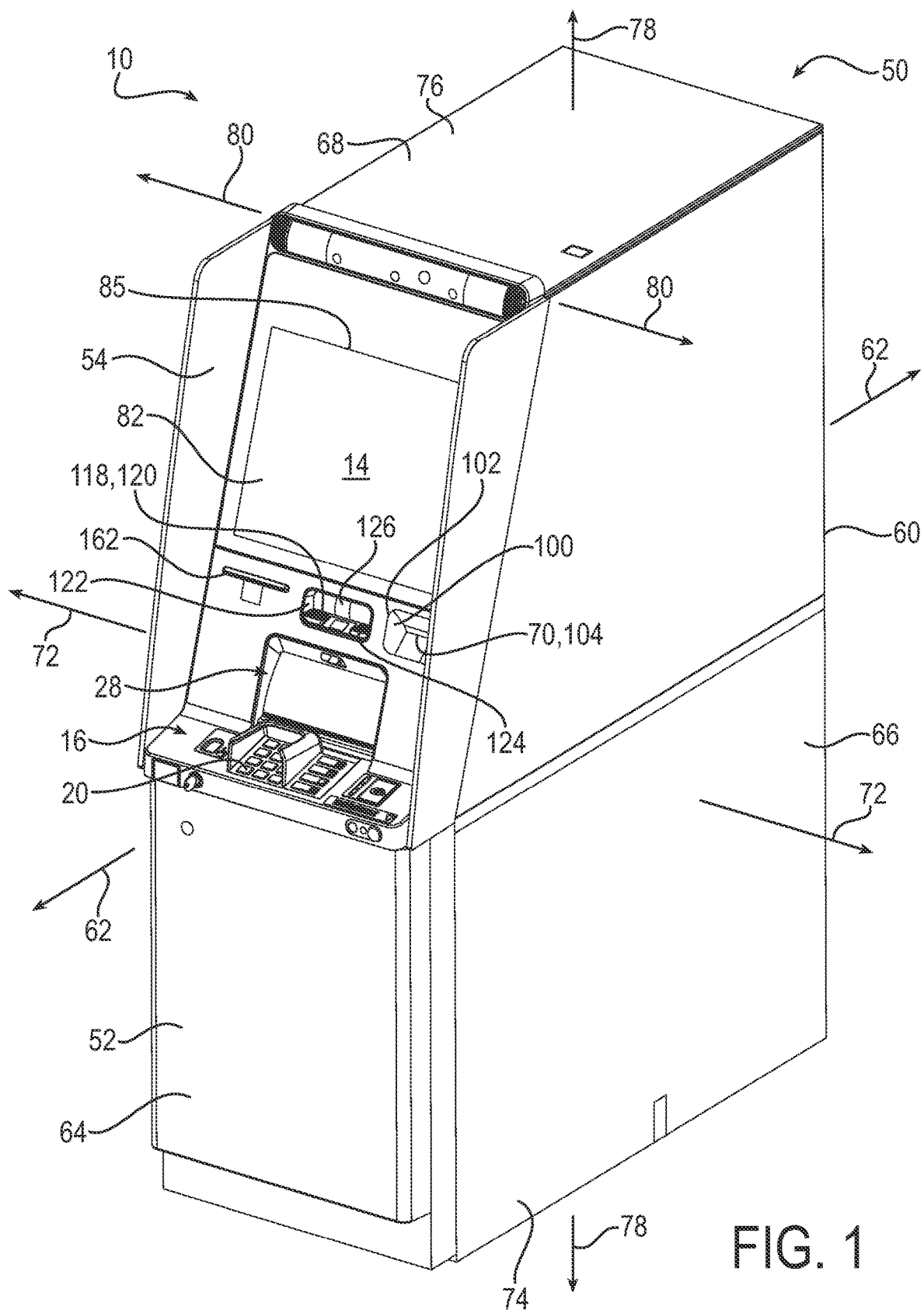
FIG. 1 is a first perspective view of an ATM according to an exemplary embodiment of the present disclosure.

Referring now to the drawings, FIGS. 1-5 disclose an exemplary ATM 10 according to one or more implementations of the present disclosure. The ATM 10 includes different structures and subsystems for receiving input from a user and executing transactions. The ATM 10 includes a computing device 12. The computing device 12 can be viewed a primary or overall controller of the ATM 10. The exemplary computing device 12 has one or more processors and a non-transitory, computer readable medium. The computing device 12 operates under the control of an operating system, kernel, and/or firmware and executes or otherwise relies upon various computer software applications, components, programs, objects, modules, data structures, etc. The exemplary computing device 12 can operate under the control of the Windows® operating system. The computer readable medium (memory) of the computing device 12 can include random access memory (RAM) devices comprising the main storage of computing device 12, as well as any supplemental levels of memory, e.g., cache memories, non-volatile or backup memories (e.g., programmable or flash memories), read-only memories, etc. In addition, the memory may be considered to include memory storage physically located elsewhere from RAM in the computing device 12, such as any cache memory in a processor, as well as any storage capacity used as a virtual memory. The computing device 12 can also include one or more mass storage devices such as, for example, a floppy or other removable disk drive, a hard disk drive, a direct access storage device (DASD), an optical drive (e.g., a CD drive, a DVD drive, etc.), and/or a tape drive, among others, represented by memory 46.

Figure 2:
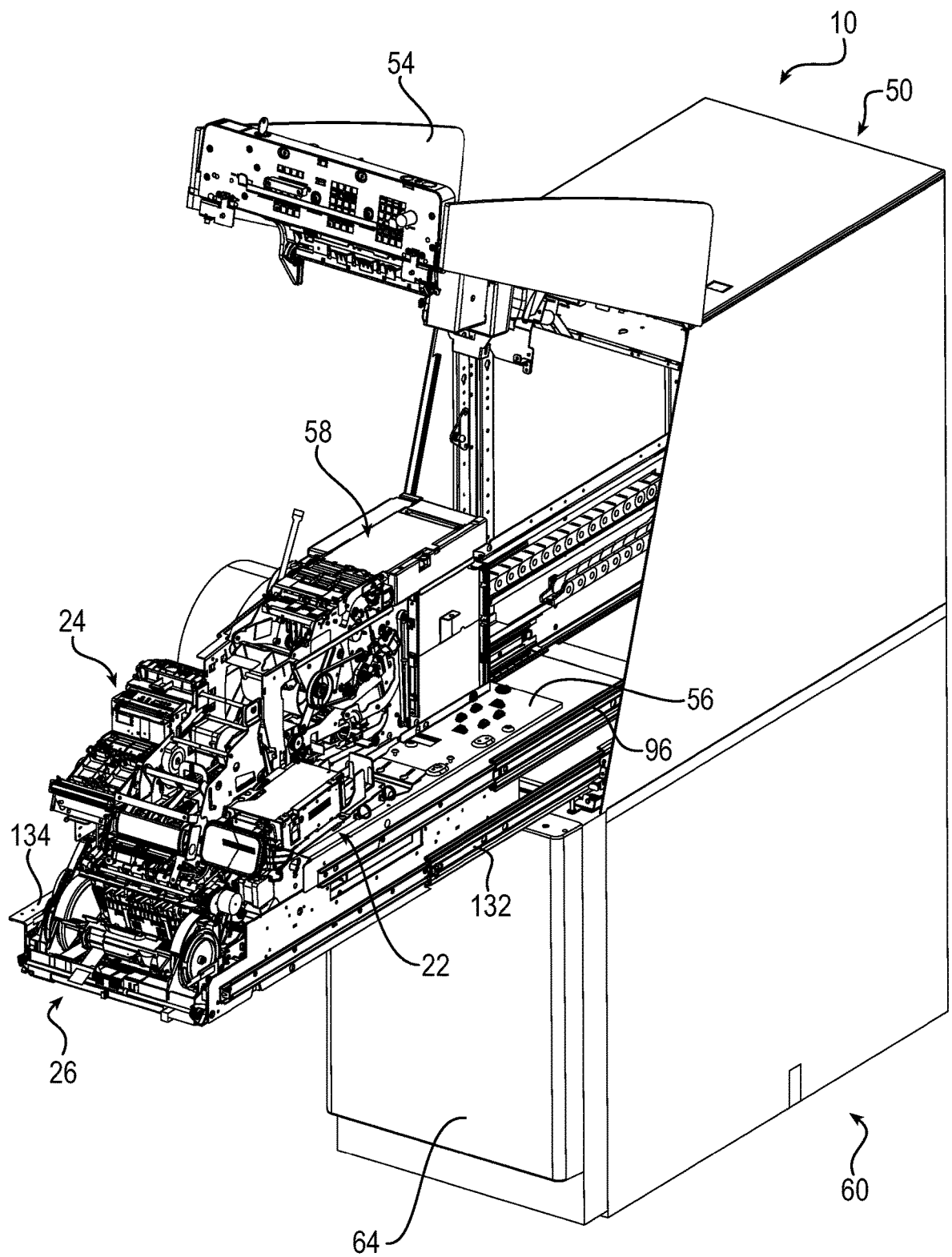
FIG. 2 is a second perspective view of the ATM shown in FIG. 1, with a fascia of the ATM opened and upper-portion, internal subcomponents of the ATM pulled out of a housing of the ATM.
Figure 3:
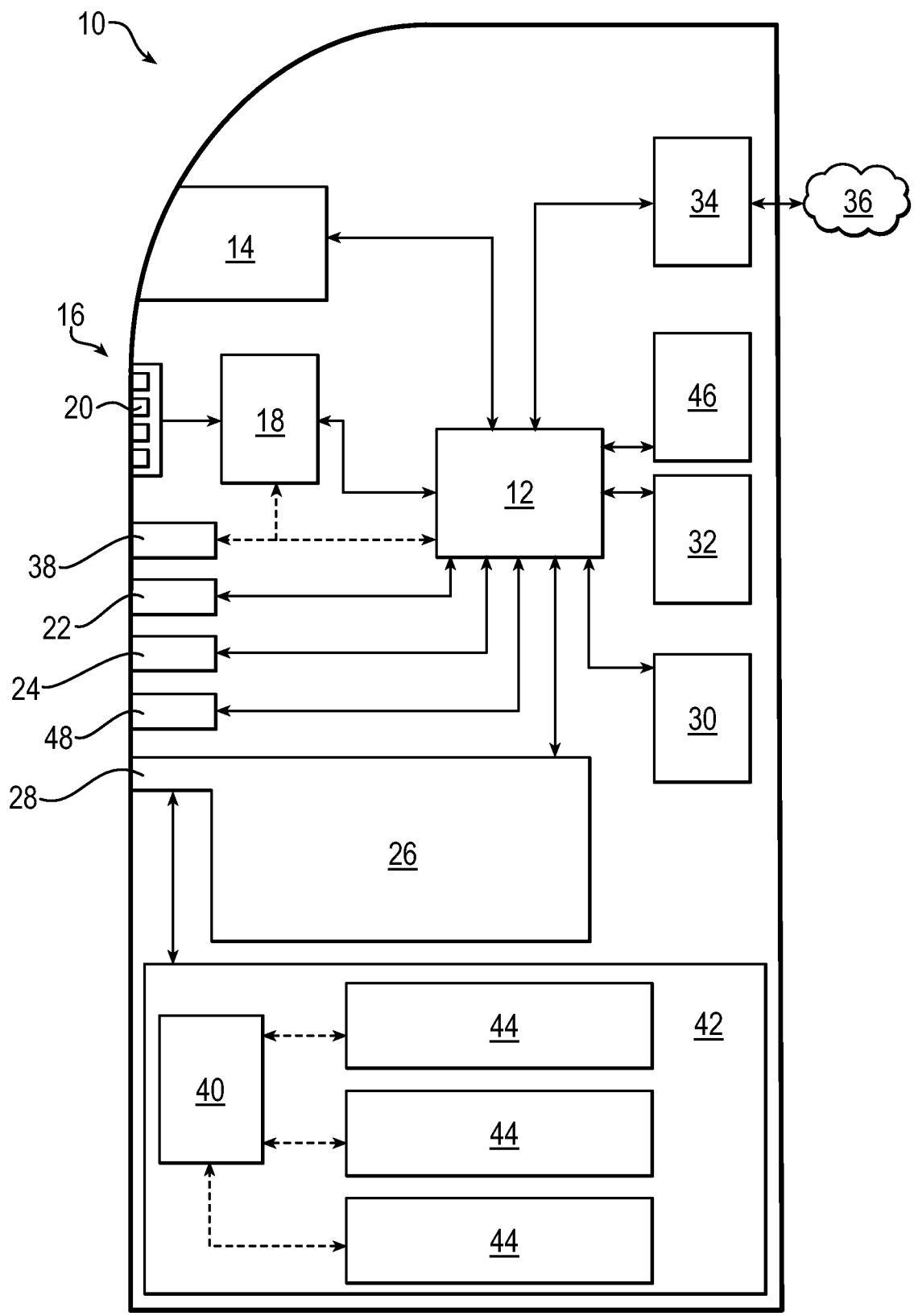
FIG. 3 is a schematic representation of the subsystems of the ATM shown in FIG. 1.
Figure 5:
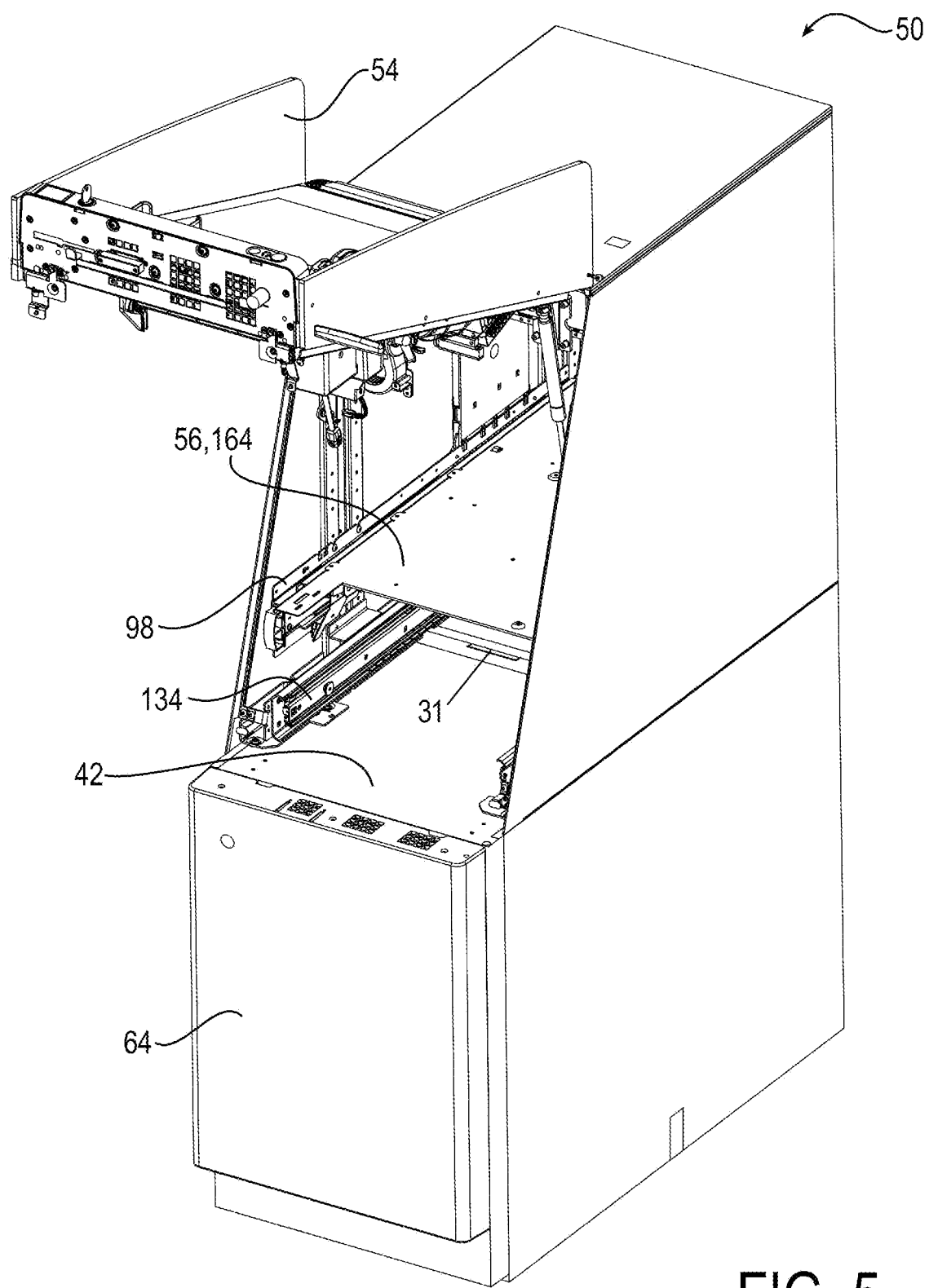
FIG. 5 is a third perspective view of the ATM shown in FIG. 1, with the fascia of the ATM opened, a tray of the upper portion of the ATM pushed into the housing of the ATM, and upper-portion, internal subcomponents omitted.
Figure 9:
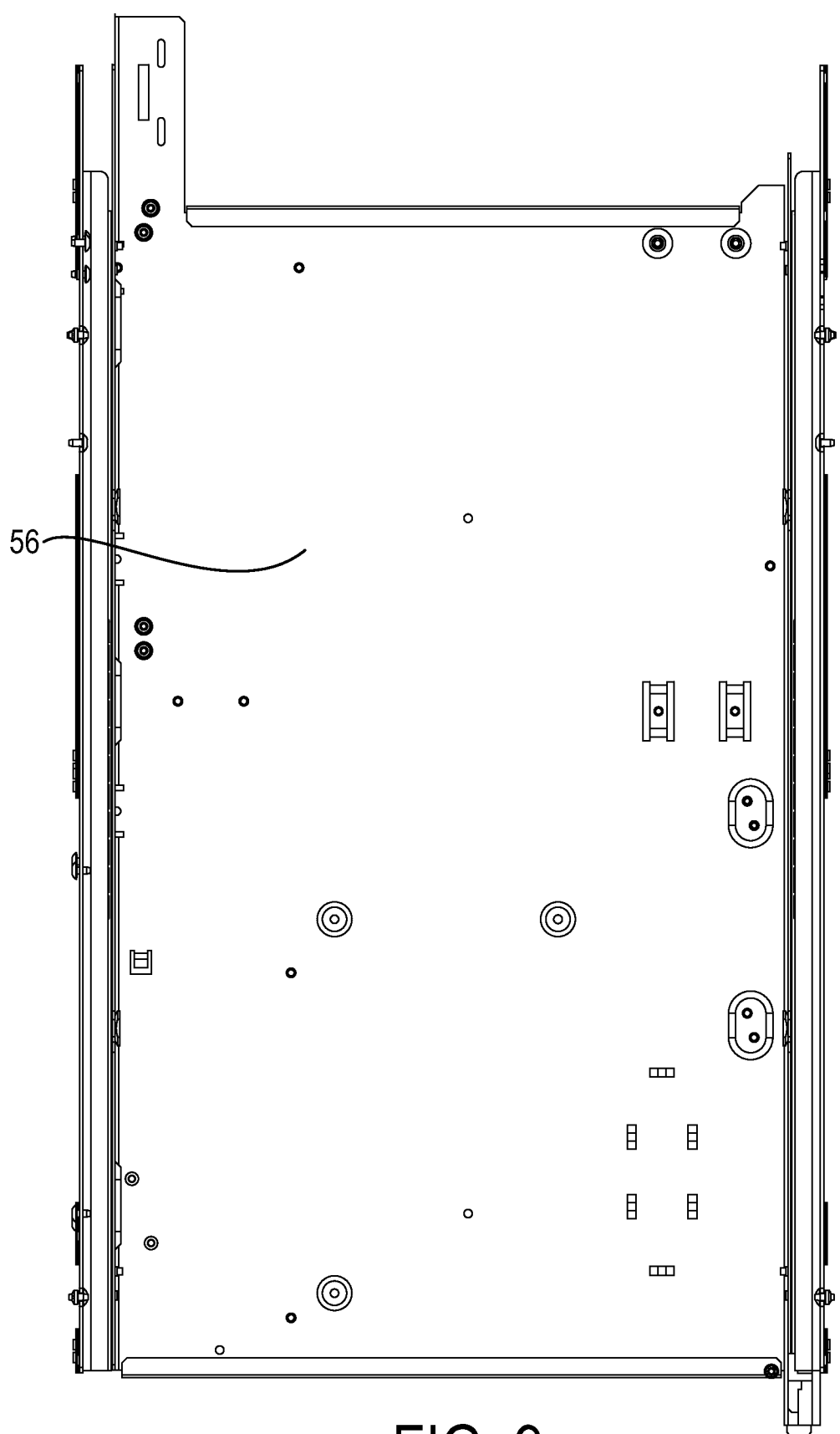
FIG. 9 is a bottom view of the tray of the upper portion of the ATM.

The exemplary computing device 12 can be housed in a housing 50 of the ATM 10. The housing 50 can define a depth between a forward side 52 and an aft side 60 along a longitudinal horizontal axis 62. "Longitudinal" refers to "centered." The housing 50 can also define a width between a right side 66 and a left side 68 along a lateral horizontal axis 72. The housing 50 can also define a height between a bottom edge 74 and a top edge 76 along a longitudinal vertical axis 78. A fascia 54 can be pivotally mounted to the housing. The fascia 54 can be mounted to the housing 50 for pivoting movement about a pivot axis 80 parallel to the lateral horizontal axis 72. The fascia 54 can selectively close a fourth side of the housing 50 of the ATM 10. FIG. 1 shows the fascia 54 in a first position. FIGS. 2 and 5 show the fascia 54 in a second position pivotally spaced from the first position.

The exemplary ATM 10 also includes a display 14. The exemplary display 14 is mounted in the fascia 54. The computing device 12 can control the display 14 to present information to the user for furthering the completion of the transaction. The display 14 can be a touch screen that allows the user to enter information through the display 14. The exemplary display 14 is configured to transmit any user-entered information to the computing device 12.

The display 14 can be mounted in the fascia 54 and can thereby be moveable with the fascia 54 as the fascia 54 moves between the first position and the second position. The display 14 can include a display side 82 through which information is displayed. As referenced in FIGS. 14, 18, 19, and 23, the display 14 can also include a rear side 84 opposite to the display side 82. The display 14 can also include a plurality of lateral sides extending between the display side 82 and the rear side 84. Exemplary lateral sides are referenced at 86 and 88. The exemplary lateral side 86 is shown as an edge or "profile" and the exemplary lateral side 88 is visible as a surface.

The exemplary ATM 10 also includes a key pad 16 and an encryption module 18. Generally, the combination of a key pad and an encryption module are referred to in the art as an encrypted pin pad (EPP). The exemplary EPP is mounted in the fascia 54. The exemplary key pad 16 includes a plurality of keys, such as key 20. The exemplary encryption module 18 has one or more processors and a non-transitory, computer readable medium. The user can press the keys of the key pad 16 to enter a Personal Identification Number (PIN). The key pad 16 is placed in communication with the encryption module 18 and therefore the numbers of the PIN are received by the encryption module 18. It is noted that the communication of the PIN is direct and secure; the PIN cannot be intercepted between the key pad 16 and the encryption module 18. The PIN is then encrypted by the encryption module 18 to define a PIN block. The encryption module 18 includes a network encryption key and applies the network encryption key to encrypt the PIN to the PIN block. The exemplary encryption module 18 is configured to transmit the PIN block to the computing device 12, which can direct the PIN block away from the ATM 10 during the completion of a financial transaction.

The exemplary ATM 10 also includes a card reader 22 having an inlet 90. The exemplary card reader 22 is disposed on a tray 56 that can be selectively drawn out of the housing 50 when the fascia 54 is in an open (or second) position (FIG. 2). The exemplary tray 56 is mounted in the housing 50. When the tray 56 is moved back into the housing 50, the fascia 54 can be moved to a closed (or first) position (FIG. 1). The card reader 22 can receive a token from the user, such as a card. A card can enter and exit the inlet 90 of the card reader 22. The card reader 22 can be configured to execute read and write operations with respect to any storage medium fixed to the user's card. The exemplary card reader 22 can be configured to read data from a magnetic strip on the back of a card or from a chip embedded in the card. The exemplary card reader 22 can be configured to transmit any data read from the user's card to the computing device 12, which can direct the data read from the card away from the ATM 10 during the completion of a financial transaction. The exemplary card reader 22 can also be configured to receive commands and data from the computing device 12 and change data stored on the user's card.

Figure 4:
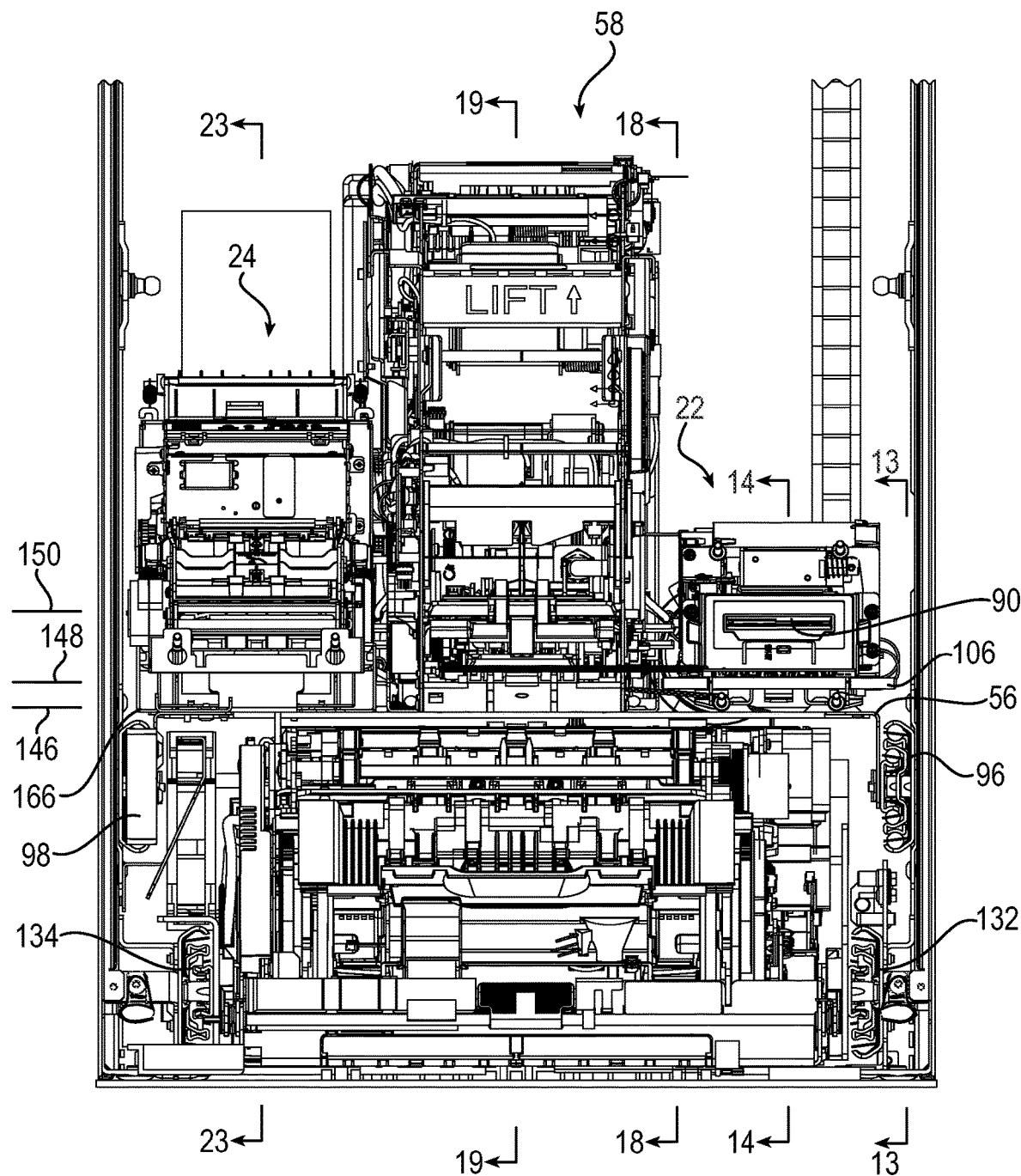
FIG. 4 is a front view of the ATM with the fascia of the ATM opened to a second position and upper-portion, internal subcomponents of the ATM visible.

The exemplary ATM 10 also includes a receipt printer 24 having an outlet 92. The receipt printer 24 is also disposed on the tray 56. The computing device 12 can control the receipt printer 24 to print a receipt for a user when a transaction has been completed. The receipt printer 24 can communicate one or more messages to the computing device 12, such as a maintenance message regarding the need to refill printer paper. As shown in FIG. 4, the receipt printer 24 includes a downwardly-facing surface 166 that contacts an upwardly-facing surface 164 (referenced in FIGS. 6-8) of the tray 56 and extends laterally beyond a lateral edge of the upwardly-facing surface 164. The efficiency of the utilization of space within the ATM 10 is thus enhanced.

The exemplary ATM 10 also includes a check receiver 58. The check receiver 58 is positioned in the housing 50. The exemplary check receiver 58 includes an intake portion 130 with an inlet 94 communicating with the exterior of the housing 50. The exemplary check receiver 58 also has a check reader portion 128. The exemplary forward portion 130 is pivotally mounted to the aft portion 128 for pivoting movement about an axis 136. The forward portion 130 defines the inlet of the check receiver 58. The intake portion 130 receives a check from a user and transports the check to the check reader portion 128. The check reader portion 128 is configured to receive a check from the intake portion 130, scan data that is displayed on the check, and store the check. The check reader portion 128 can determine whether or not the check is legitimate. The capacity of the check reader portion 128 to perform these functions allows the intake portion 130 to have minimal components and thus minimal height. The exemplary intake portion 130 is therefore positioned below the display 14 and the check reader portion 128 is positioned behind the display 14. The check receiver 58 thus wraps around the display 14 to enhance the efficient use of physical space by the ATM 10. The check receiver 58 can communicate one or more messages to the computing device 12, such as the data read from a received check or that the indicia on the check could not be read.

The exemplary ATM 10 also includes a cash recycler. The exemplary cash recycler includes a head portion 26 and a base portion 40. The cash recycler is configured to receive a first note of currency from a first user of the ATM 10 and dispense the first note of currency to a subsequent, second user of the ATM 10. In the exemplary embodiment, the head portion 26 is not mounted on the tray 56 but under the tray 56 and is mounted such that it can be drawn out of the housing 50 like the tray 56.

The exemplary head portion 26 of the cash recycler communicates with the exterior of the ATM 10 through a slot 28 in the fascia 54. The head portion 26 of the cash recycler can include one or more sensors and transmit signals from any such sensors to the computing device 12 to execute an operation. The computing device 12 can control the head portion 26 of the cash recycler in response to such signals. For example, the head portion 26 of the cash recycler can include a sensor that detects if currency received is counterfeit or if currency notes are bundled or "stuck" together rather than moving singularly through the head portion 26 of the cash recycler. The computing device 12 can respond to such signals by changing the direction of movement of the banknotes, or by directing some other action.

The exemplary ATM 10 also includes a printer module 30. The printer module 30 can generate a continuous record of all transactions executed by the ATM 10. The computing device 12 can control the printer module 30 to supplement the record after each transaction has been completed. The printer module 30 can communicate one or more messages to the computing device 12, such as a maintenance message regarding the need to refill printer paper.

The exemplary ATM 10 also includes an access module 32. The access module 32 can be positioned proximate to a rear side of the ATM 10. The access module 32 can be utilized by service and support technicians. For example, the access module 32 can be utilized by a field engineer to complete software updates to the computing device 12. The access module 32 can also be utilized when non-software updates and maintenance is performed, such as the refilling of printer paper or currency.

The exemplary ATM 10 also includes a transceiver 34. The exemplary transceiver 34 is configured to facilitate communication between the computing device 12 and other computing devices that are distinct from and physically remote from the computing device 12. An example of such a remote computing device is a server computing device, such as a banking or financial institution server communicating with a plurality of ATMs. The exemplary transceiver 34 places the computing device 12 in communication with one or more networks, such as network 36. The network 36 can be a local area network (LAN), a wide area network (WAN) such as the Internet, a Multi-protocol label switching (MPLS) network, a cellular network such as operated by cellular phone companies, or any combination thereof. The network 36 can be a financial/bank network such as NYCE, PULSE, PLUS, Cirrus, AFFN, Interac, Interswitch, STAR, LINK, MegaLink, or BancNet. The transceiver 34 can transmit data and requests for input generated by the computing device 12 and receive responses to these requests, directing these responses to the computing device 12.

The exemplary ATM 10 also includes a transceiver 38. The exemplary transceiver 38 is configured to facilitate communication between at least one of the encryption module 18 and the computing device 12 and other computing devices that are distinct from and physically proximate to the ATM 10. An example of such a proximate computing device is a smartphone possessed by the user. The dashed connection lines in FIG. 1 represent optional interconnections. The exemplary transceiver 38 can place the user's smartphone in communication with the encryption module 18, the computing device 12, or both. The exemplary transceiver 38 can implement various communication protocols. For example, the transceiver 38 can be a Near Field Communication (NFC) device. Alternatively, the transceiver 38 can be a Bluetooth beacon. The transceiver 38 can transmit and receive data and requests for input generated by the encryption module 18 and/or the computing device 12, such transmissions occurring with the user's smart phone for example.

The exemplary ATM 10 also includes a safe 42. The head portion 26 of the cash recycler can be positionable proximate to a top of the safe 42. The safe 42 can be housed in a lower portion of the housing 50 of the ATM 10. The check receiver 58 and the display 14 are positioned in an upper portion of the housing 50 while the safe 42 is positioned in a lower portion of the housing 50. The housing 50 can also include a door 64 pivotally mounted to the housing 50 to access the safe 42.

The exemplary ATM 10 can also include first and second telescopic tracks, referenced at 96 and 98. The telescopic tracks 96, 98 interconnect the tray 56 and the housing 50. The tray 56 can be horizontally slidable through the first and second telescopic tracks 96, 98 between an extended position and a retracted position. The card reader 22, the check receiver 58 and the receipt printer 24 are thus jointly moveable in and out of the housing 50 on the tray 56 along the longitudinal horizontal axis 62. The tray 56 is shown in the extended position in FIG. 2. The tray 56 is shown in the retracted position in FIG. 5. Operations of the ATM 10 occur when the tray 56 is in the retracted position. The fascia 54, when moved to the first position, cooperates with the housing 50 to enclose the tray 56 (in the retracted position), the card reader 22, the check receiver 58 and the receipt printer 24.

Figure 15:
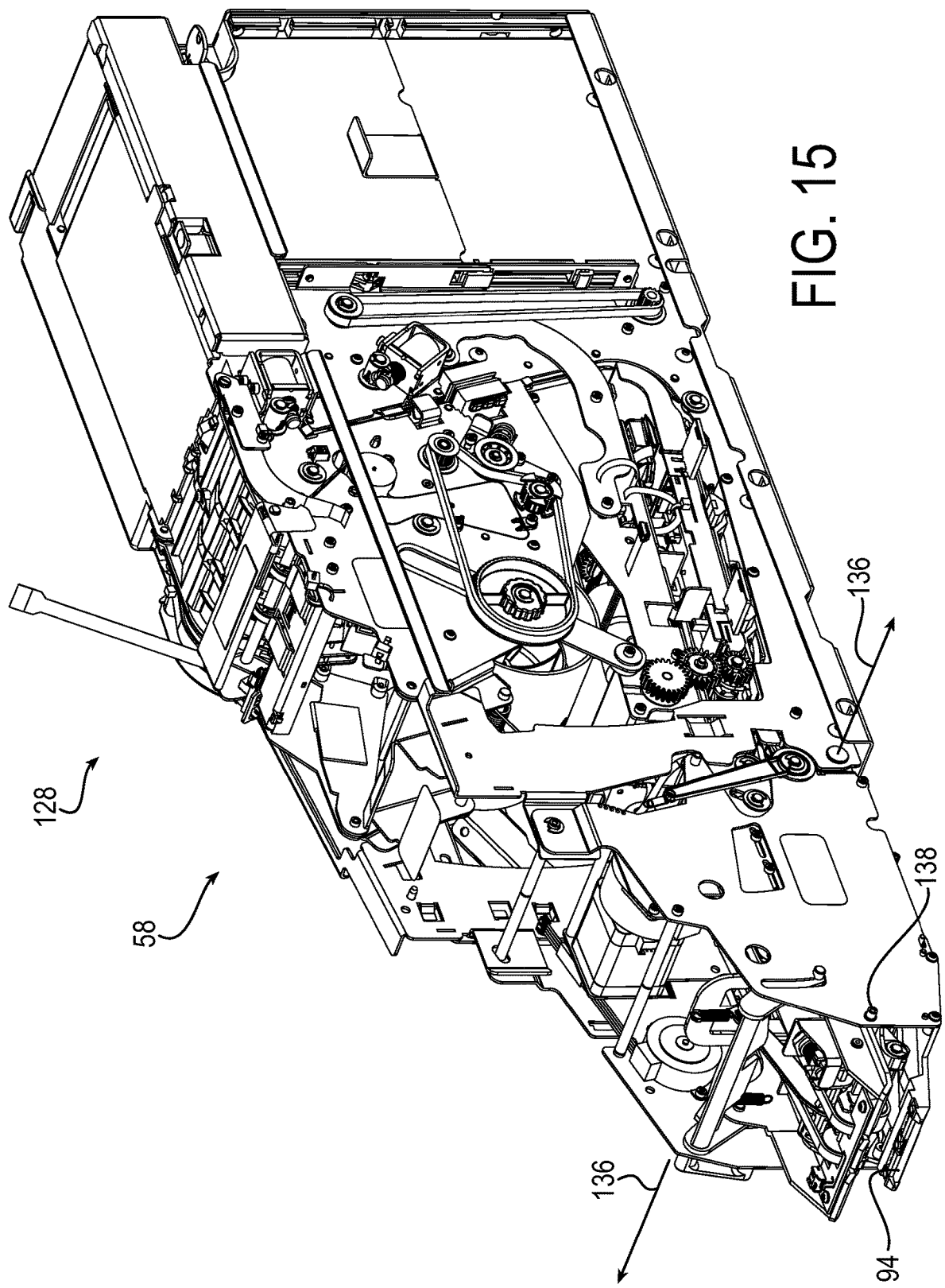
FIG. 15 is a perspective view of a check reader of the ATM.
Figure 16:
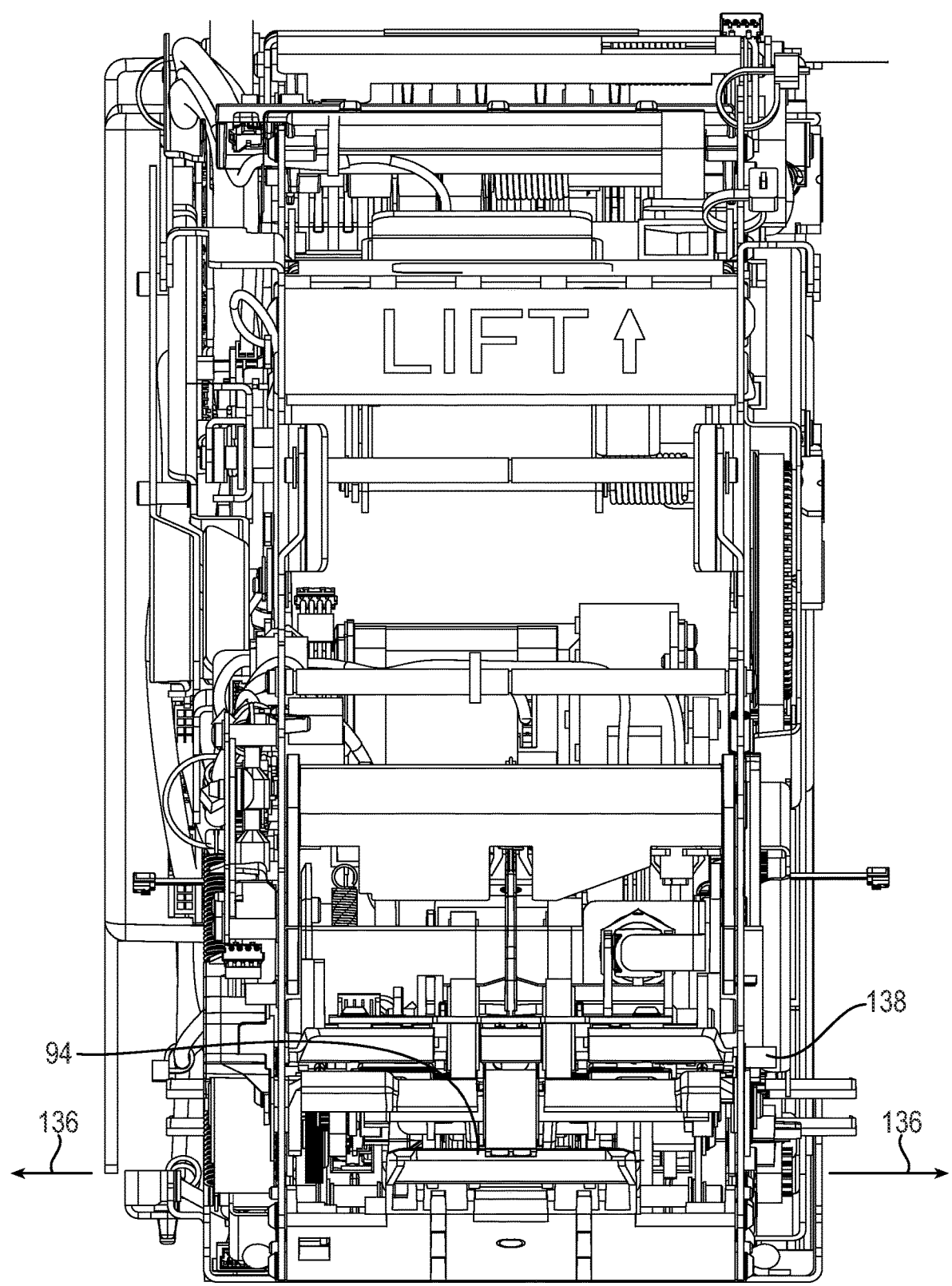
FIG. 16 is a front view of the check reader of the ATM.

The exemplary ATM 10 can also include third and fourth telescopic tracks, referenced at 132 and 134 in FIG. 15. The telescopic tracks 132, 134 interconnect the head portion 26 of the cash recycler and the housing 50. The head portion 26 of the cash recycler can be horizontally slidable through the third and fourth telescopic tracks 132, 134 between an extended position and a retracted position. The head portion 26 of the cash recycler is shown in the extended position in FIG. 2. The head portion 26 of the cash recycler is not visible but is in the retracted position in FIG. 1. Operations of the ATM 10 occur when the head portion 26 of the cash recycler is in the retracted position.

As best shown in FIG. 4, the exemplary first and second telescopic tracks 96, 98 are below the card reader 22, the check receiver 58 and the receipt printer 24 along the longitudinal vertical axis 78. The exemplary first and second telescopic tracks 96, 98 and the exemplary third and fourth telescopic tracks 132, 134 are laterally adjacent to the cash recycler the lateral horizontal axis 72. The efficiency of the utilization of space within the ATM 10 is thus enhanced.

The exemplary base portion 40 of the cash recycler is positioned in the safe 42. One or more cassettes or cash boxes 44 are also positioned and protected in the safe 42. Banknotes are stored in the cassettes 44 for disbursement to a user of the ATM 10. The exemplary base portion 40 of the cash recycler can extract the banknotes from one or more of the cassettes 44 and direct them to the head portion 26 of the cash recycler through an aperture 31 in the safe 42. The exemplary base portion 40 of the cash recycler can also receive banknotes from the head portion 26 of the cash recycler through the port and direct the banknotes to the one or more of the cassettes 44. Banknotes can move in either direction through the port, based on the operation being performed by the ATM 10. The exemplary base portion 40 of the cash recycler can communicate with and be controlled by the computing device 12 for at least some operations. Each of the cassettes 44 can and the base portion 40 of the cash recycler can be mounted together on a rack in the safe 42 whereby the positioning of the cassettes is controlled. Further, the each of the cassettes 44 and the base portion 40 of the cash recycler can include mating connectors of any form, whereby a positive interconnection is confirmed electronically. When one or more of the cassettes 44 and the base portion 40 of the cash recycler are not properly interconnected, a signal or lack thereof can be communicated to or sensed by the computing device 12 whereby an error message is generated or the ATM 10 can be disabled.

The exemplary ATM 10 also includes a scanner 48. The scanner 48 can scan, for example, at least a portion of a display of a smart phone and communicate the scanned display to the computing device 12. A token can be displayed on the display of the smart phone and thus scanned by the scanner 48. The token can be a bar code, a quick response (QR) code, a number, a string of alphanumeric characters, a weblink, or some other symbolic indicia. The exemplary scanner 48 is configured to transmit any scanned data to the computing device 12, which can direct the scanned away from the ATM 10 during completion of a financial transaction.

Figure 13:
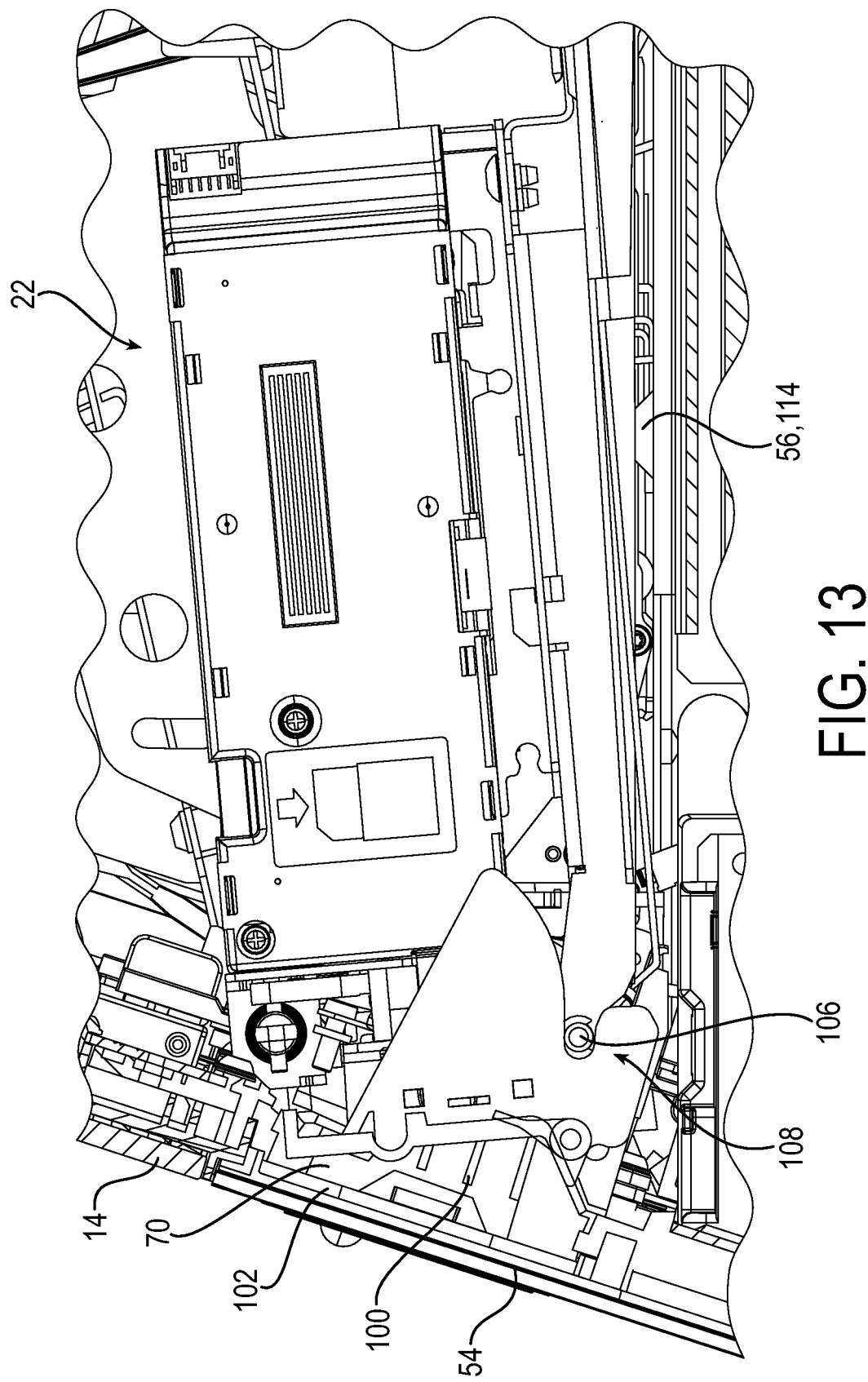
FIG. 13 is a first cross-sectional view of the ATM with the fascia closed, taken in a plane referenced by section lines 13-13 in FIG. 4.
Figure 14:
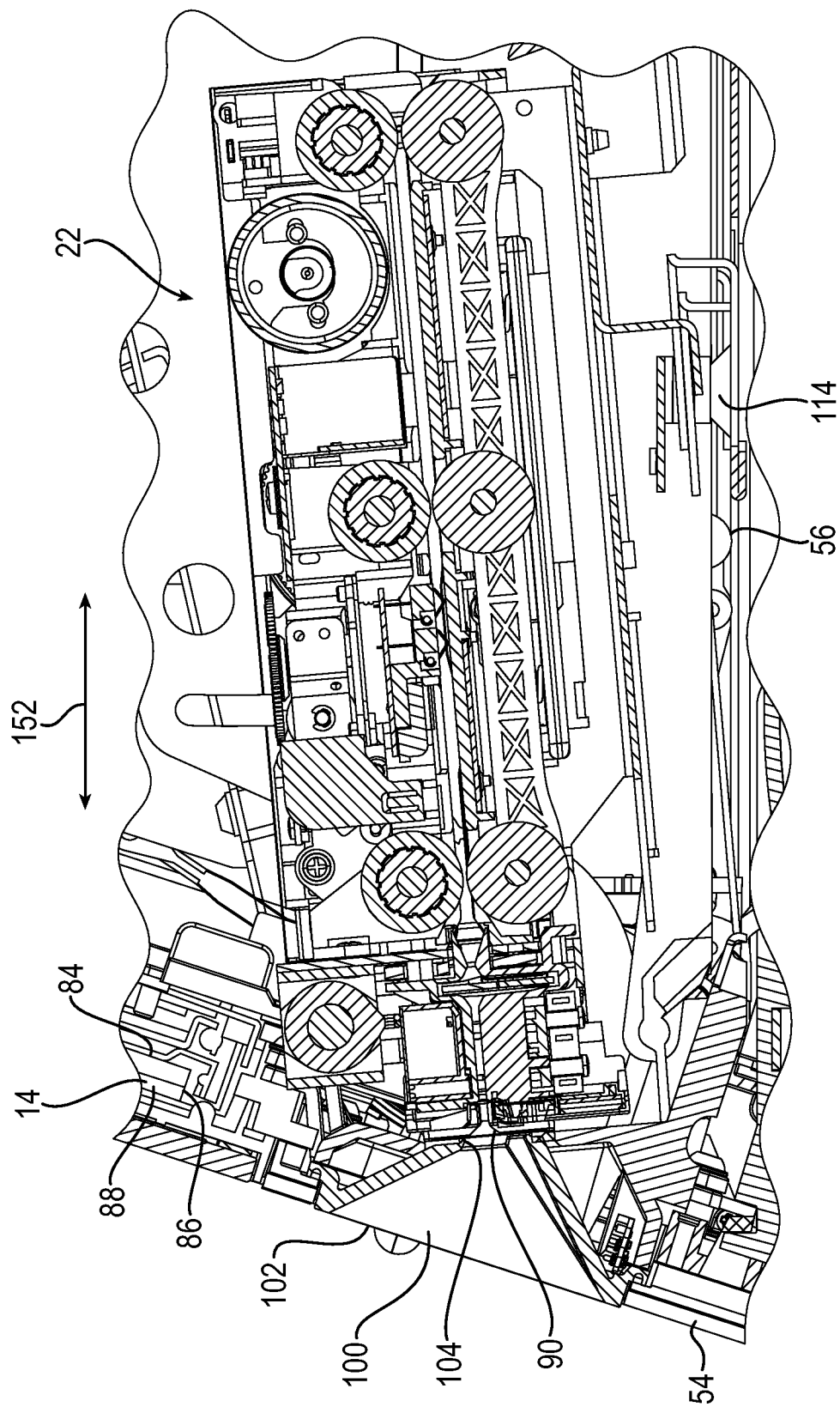
FIG. 14 is a second cross-sectional view of the ATM with the fascia closed, taken in a plane referenced by section lines 14-14 in FIG. 4.

The ATM 10 can also include a first bezel 70. The exemplary first bezel 70 is mounted in the fascia 54. As best shown in FIGS. 13 and 14, the first bezel 70 can define a passageway 100 for a user's card to pass through. The passageway 100 can extend between an inlet 102 and an outlet 104. The exemplary outlet 104 of the first bezel 70 is aligned with and communicates with the inlet 90 of the card reader 22 when the fascia 54 is in the first position. A user's card can be put into the passageway 100 through the inlet 102, the outlet 104, then the inlet 90, and then be drawn into the card reader 22 for processing.

The exemplary card reader 22 can include a bar 106 that extends parallel to and spaced from the inlet 90 of the card reader 22. The exemplary bar 106 projects laterally from both sides of the card reader 22. The bar 106 of card reader 22 can extend laterally beyond the upwardly-facing surface 164 defined by the tray 56 to enhance the utilization of space in the ATM 10. The exemplary first bezel 70 includes latches, such as latch 108 shown in FIG. 13. The exemplary latch 108 is positioned on the right side of the first bezel 70. The exemplary first bezel 70 also includes a second latch that is shaped the same as latch 108 on the left side. The latches receive opposite sides of the bar 106 and at least partially surround the bar 106 when the fascia 54 is in the first position. The bar 106 and the latches can come into engagement with one another as the fascia 54 is moving to the first position from the second position.

Figure 10:
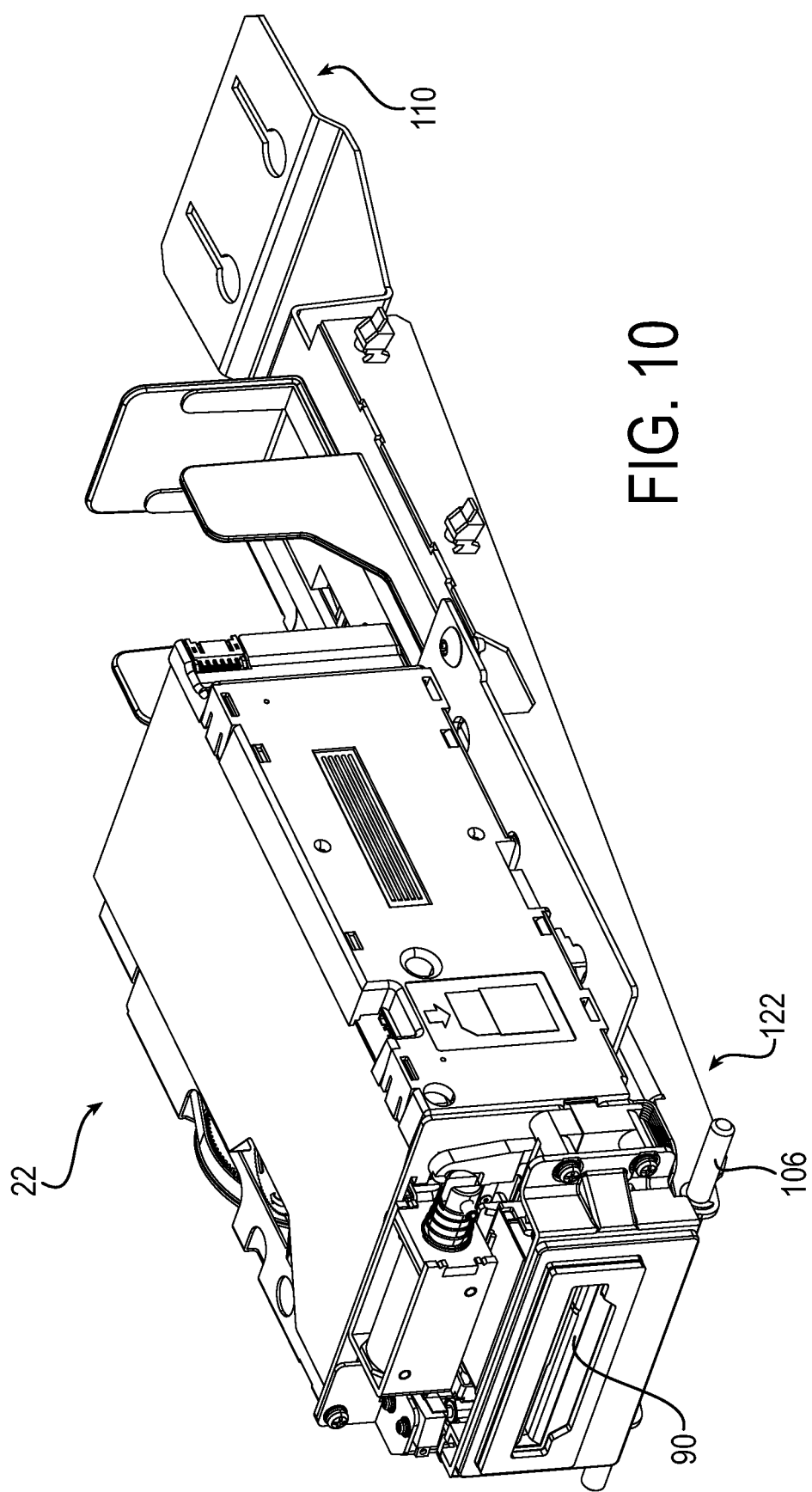
FIG. 10 is a perspective view of a card reader of the ATM.
Figure 11:
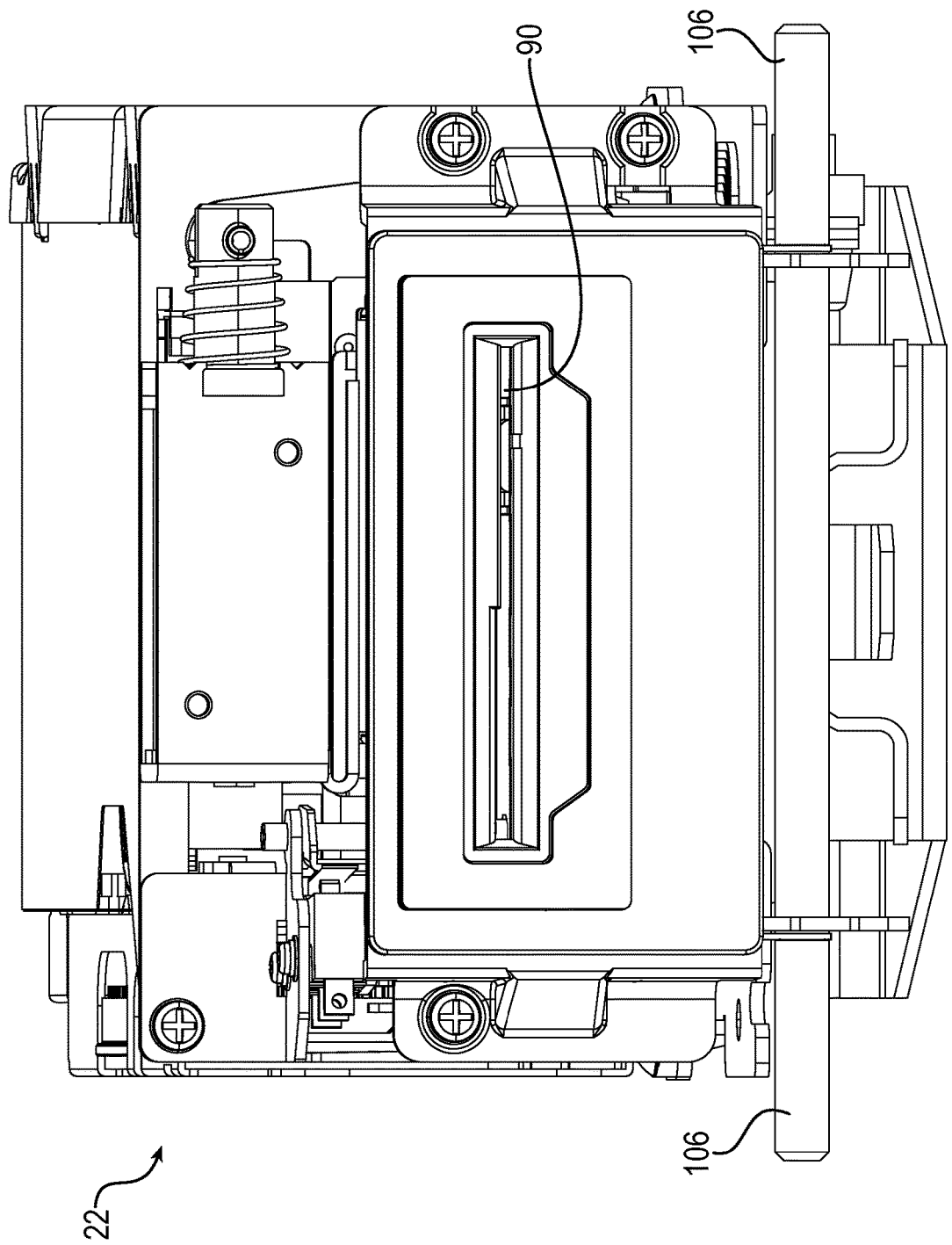
FIG. 11 is a front view of the card reader of the ATM.
Figure 12:
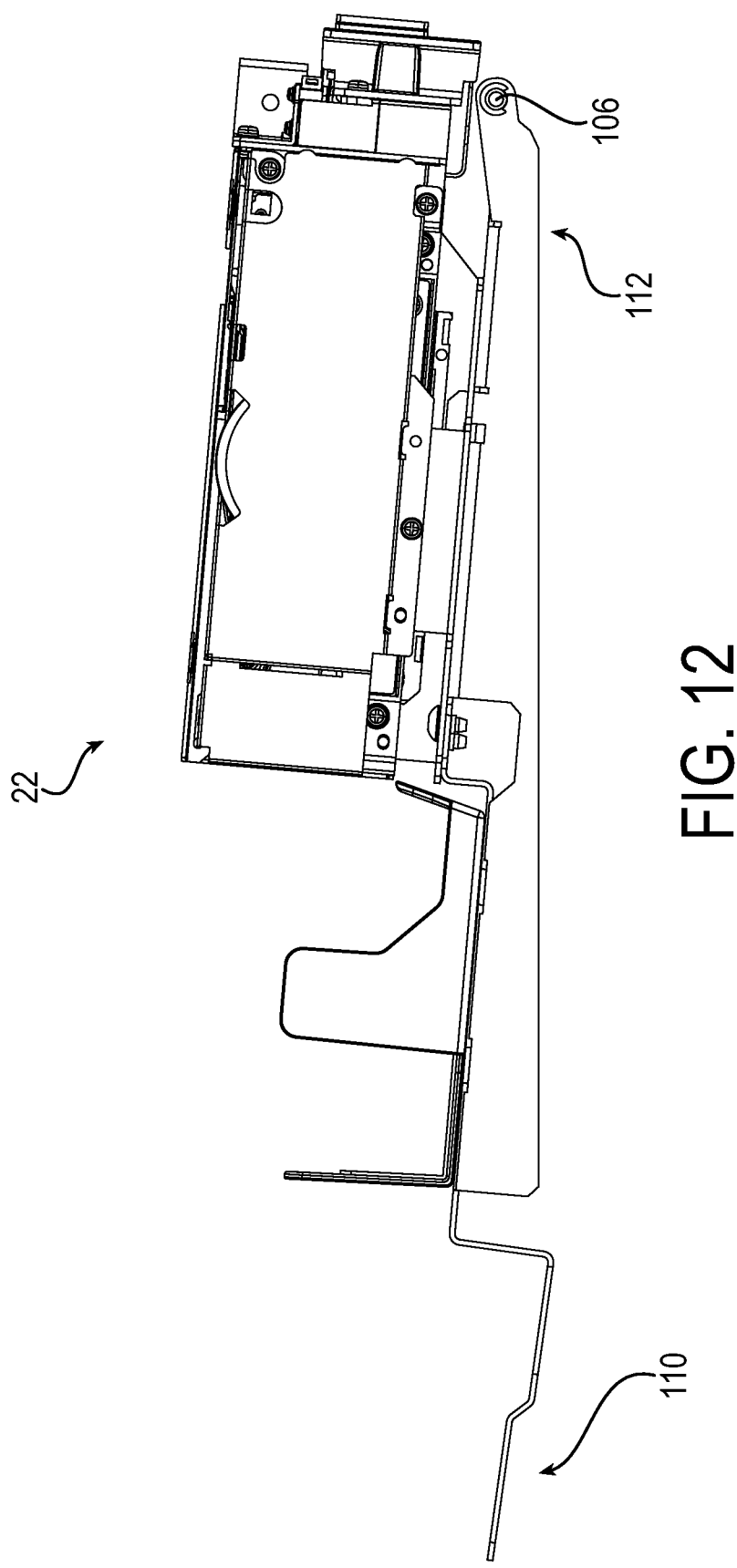
FIG. 12 is a left-side view of the card reader of the ATM.

Referring now to FIG. 10, the card reader 22 is attached to the tray 56 at an aft portion 110 of the card reader 22. A forward portion 112 of the card reader 22 is cantilevered from the aft portion 110. When the fascia 54 is in the second position, the forward portion 112 of the card reader 22 can rest on protuberances 114, 116 defined by the tray 56. As the fascia 54 is moving to the first position from the second position, the exemplary bar 106 acts as a cam follower and the latches act as cams, wherein the bar 106 and the latches cooperate to lift the card reader 22 while coming into engagement with one another. The card reader 22 is raised off of the protuberances 114, 116 through the action of the latches on the bar 106.

The ATM 10 can also include a second bezel 118. The second bezel 118 can be mounted to the fascia 54. The second bezel 118 can define a passageway 120 for a check to pass. The passageway 120 can extend between an inlet 122 and an outlet 124. The outlet 124 of the second bezel 118 can align with the inlet 94 of the check receiver 58 when the fascia 54 is in the first position. The ATM 10 can also include a door 126 movably mounted on the second bezel 118 to selectively close the passageway 120 of the second bezel 118. Movement of the door 126 can be controlled by the computing device 12.

The exemplary check receiver 58 includes bars 138, 140 that extend parallel to and spaced from the inlet 94 of the check receiver 58. The bars 138, 140 project laterally from both sides of the check receiver 58. The exemplary second bezel 118 includes latches, such as latch 142 shown in FIG. 18. The exemplary latch 142 is positioned on the right side of the second bezel 118. The exemplary second bezel 118 also includes a second latch that is shaped the same as latch 142 on the left side. The latches receive the opposite bars 138, 140 and at least partially surround the bars 138, 140 when the fascia 54 is in the first position. The bars 138, 140 and the latches come into engagement with one another as the fascia 54 is moving to the first position from the second position.

Figure 17:
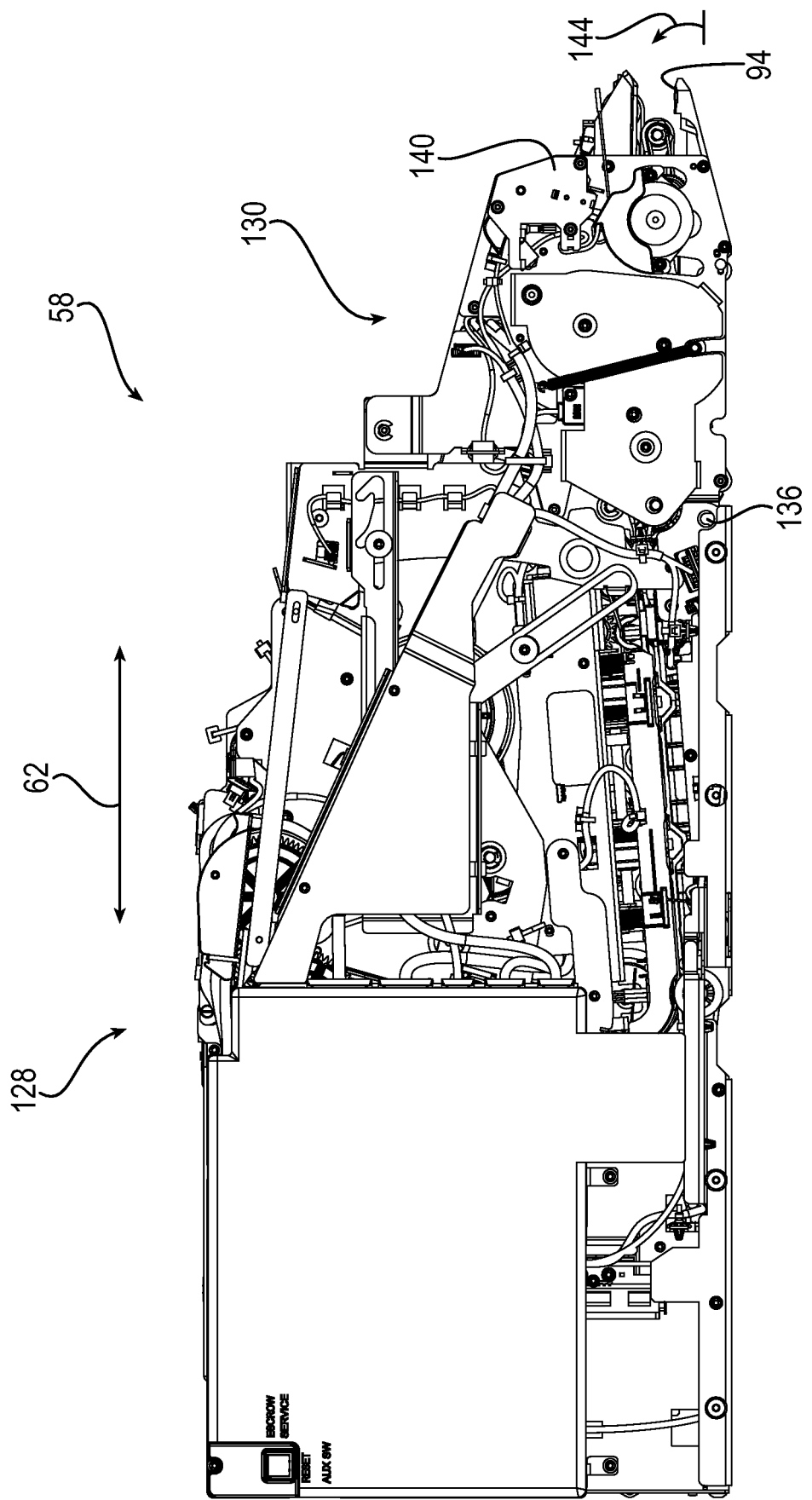
FIG. 17 is a left-side view of the check reader of the ATM.
Figure 18:
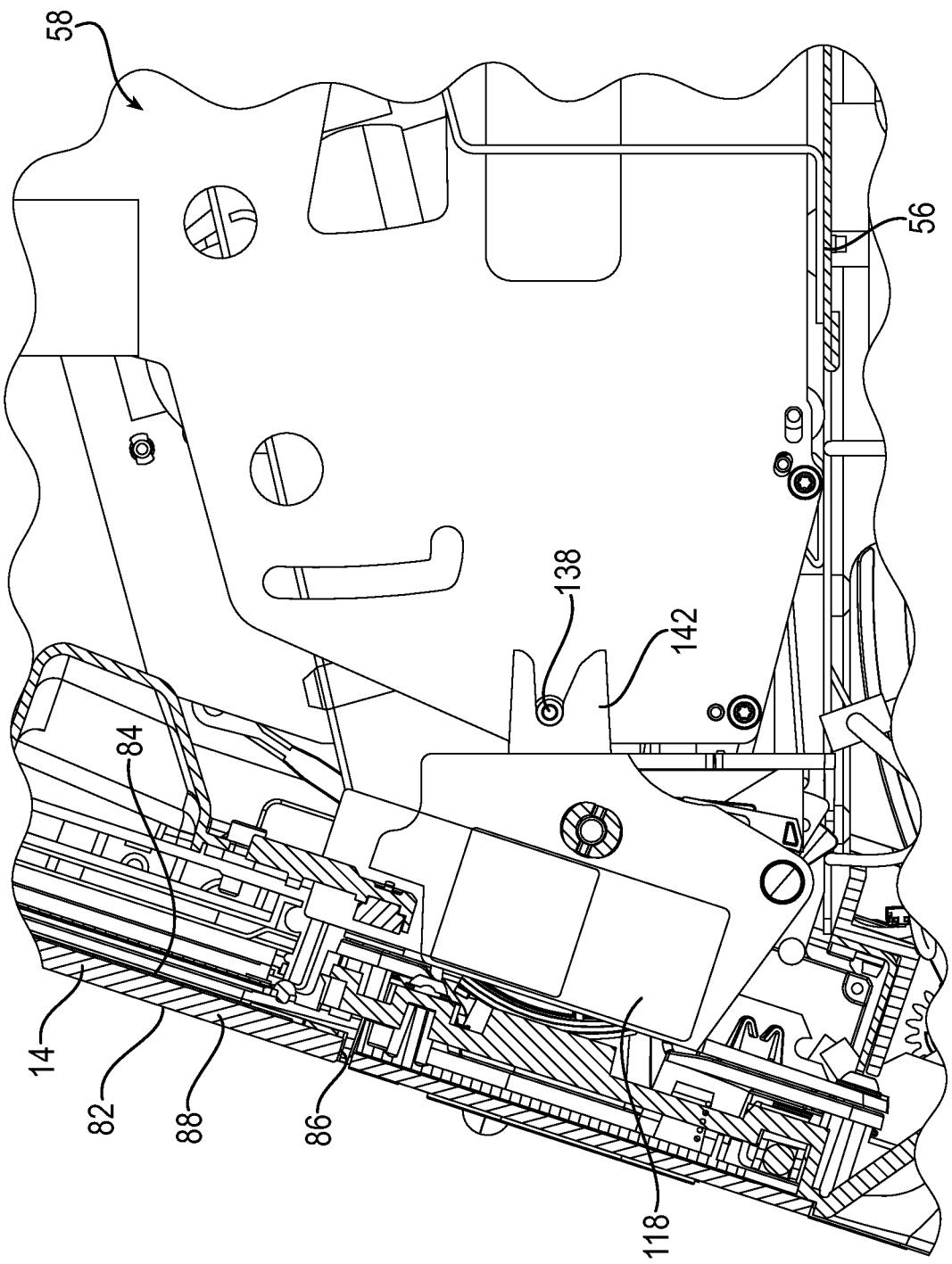
FIG. 18 is a third cross-sectional view of the ATM with the fascia closed, taken in a plane referenced by section lines 18-18 in FIG. 4.

Referring now to FIG. 10, the check receiver 58 is attached to the tray 56 at the check reader portion 128. The intake portion 130 of the check receiver 58 is cantilevered from the check reader portion 128. As the fascia 54 is moving to the first position from the second position, the bars 138, 140 act as a cam followers and the latches act as cams, wherein the bars 138, 140 and the latches cooperate to lift the intake portion 130 of the check receiver 58 while coming into engagement with one another. The exemplary intake portion 130 of the check receiver 58 is thus raised through the action of the latches on the bars 138, 140, moving relative to the check reader portion 128 as referenced in FIG. 17 at 144.

The exemplary bar 106 of the card reader 22 and the latches of the first bezel 70 engage one another at a first height elevated from the tray 56 when the fascia 54 is in the first position. In FIG. 4, the plane of the upwardly-facing surface 164 of the tray 56 is referenced at 146. The centerline of the exemplary bar 106 is referenced at 148. The distance between centerline 148 and the plane 146 is the first height. The bars 138, 140 of the check receiver 58 and the latches of the second bezel 118 engage one another at a second height elevated from the tray 56 when the fascia 54 is in the first position. The centerline of the exemplary bars 138, 140 is referenced at 150. The distance between centerline 150 and the plane 146 is the second height. As shown in FIG. 4, the exemplary first height and the exemplary second height are different from one another. These interconnections, at different heights, between modules of the ATM 10 and the fascia 54 render the fascia 54 more secure, as the maximum distance between any two connection points is reduced. The pivot axis 80 is another connection point. Also, the different connecting heights, in addition to hinge/pivot connection, improves the alignment between the fascia 54 and the various structures that mate with the fascia 54 when the fascia 54 is in the first position.

In the exemplary embodiment, the modules of the ATM 10 can be positioned directly below the display 14 to reduce the lateral size (the width) of the ATM 10. As shown in FIG. 14, the card reader 22 is directly below the lateral side 86. A vertical, dashed line is shown in FIG. 14 extending downward from at least one point on the rearward-least lateral side 86 and intersecting a portion of the card reader 22. The dashed line also represents a first vertical plane that extends parallel to the lateral horizontal axis 72 and to the longitudinal vertical axis 78. The exemplary first vertical plane thus extends through the first bezel 70, the card reader 22, and the lateral side 86. The exemplary lateral side 86 is the least rearward lateral side of the display 14. The rearmost edge of the lateral side 86 is the furthest from the aft side 60 of the ATM 10 relative to the rearmost edges of all of the other lateral sides of the display 14, along the longitudinal horizontal axis 62, when the fascia 54 is in the first position. For example, the rearmost edge of the lateral side 88, the display side 82 and the rear side 84 all extend toward the aft side 60 with increasing height of the display along the longitudinal vertical axis 78. In FIG. 14, the axis referenced at 152 is parallel to and laterally-spaced from the longitudinal horizontal axis 62. FIG. 14 also shows that in the exemplary embodiment of the present disclosure the inlet 90 of the card reader 22 is forward of the lateral side 86 when the fascia 54 is in the first position.

Figure 19:
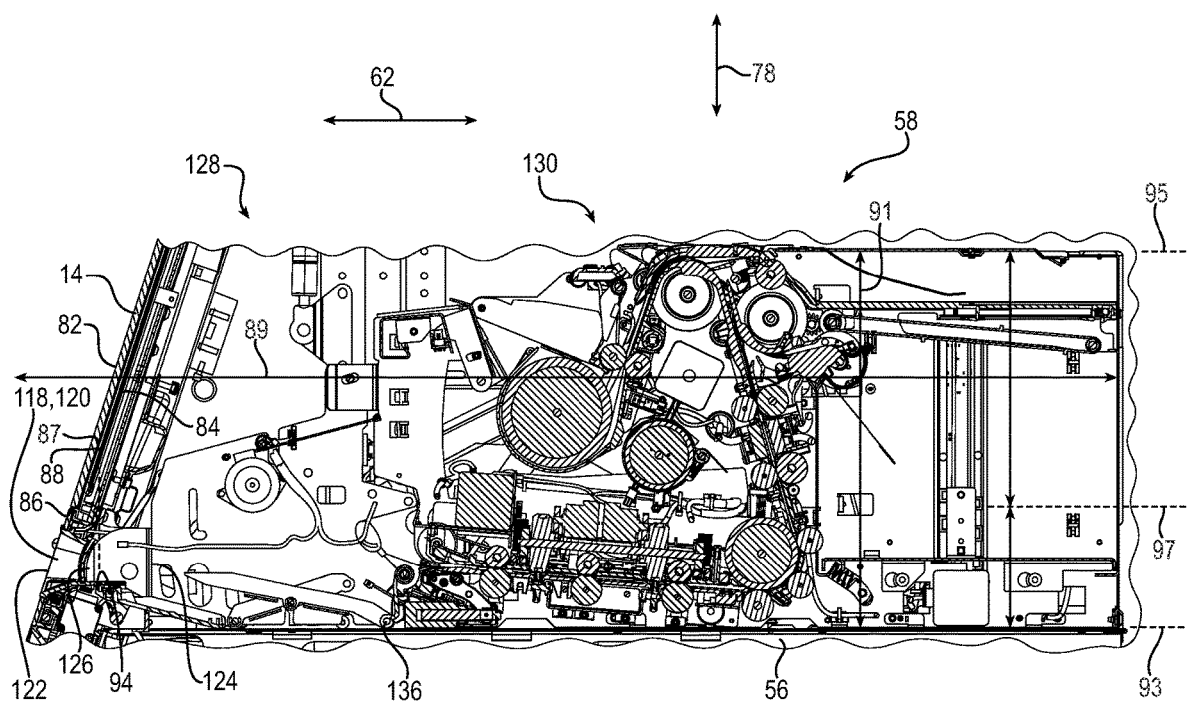
FIG. 19 is a fourth cross-sectional view of the ATM with the fascia closed, taken in a plane referenced by section lines 19-19 in FIG. 4.
Figure 20:
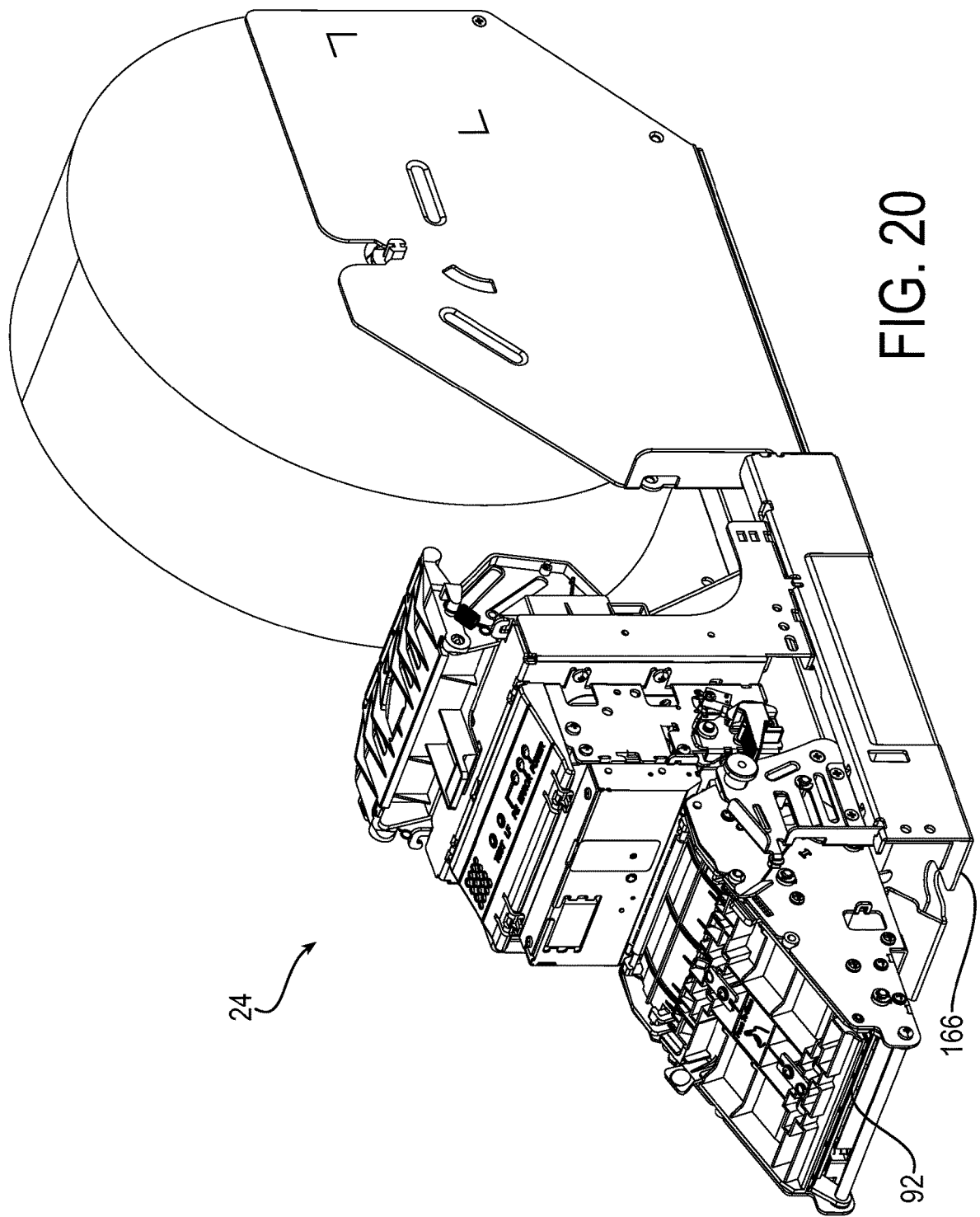
FIG. 20 is a perspective view of a receipt printer of the ATM.
Figure 21:
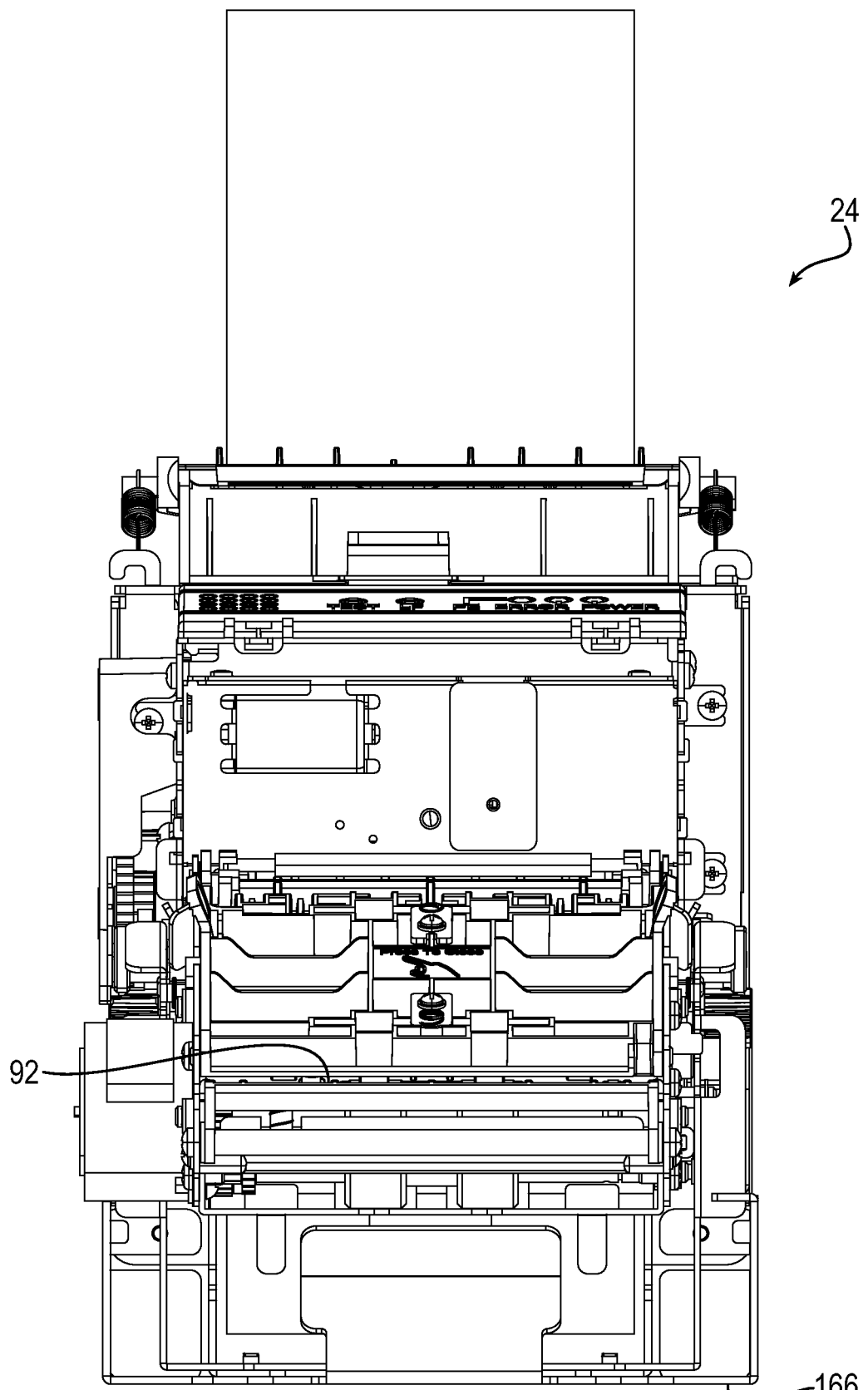
FIG. 21 is a front view of the receipt printer of the ATM.
Figure 22:
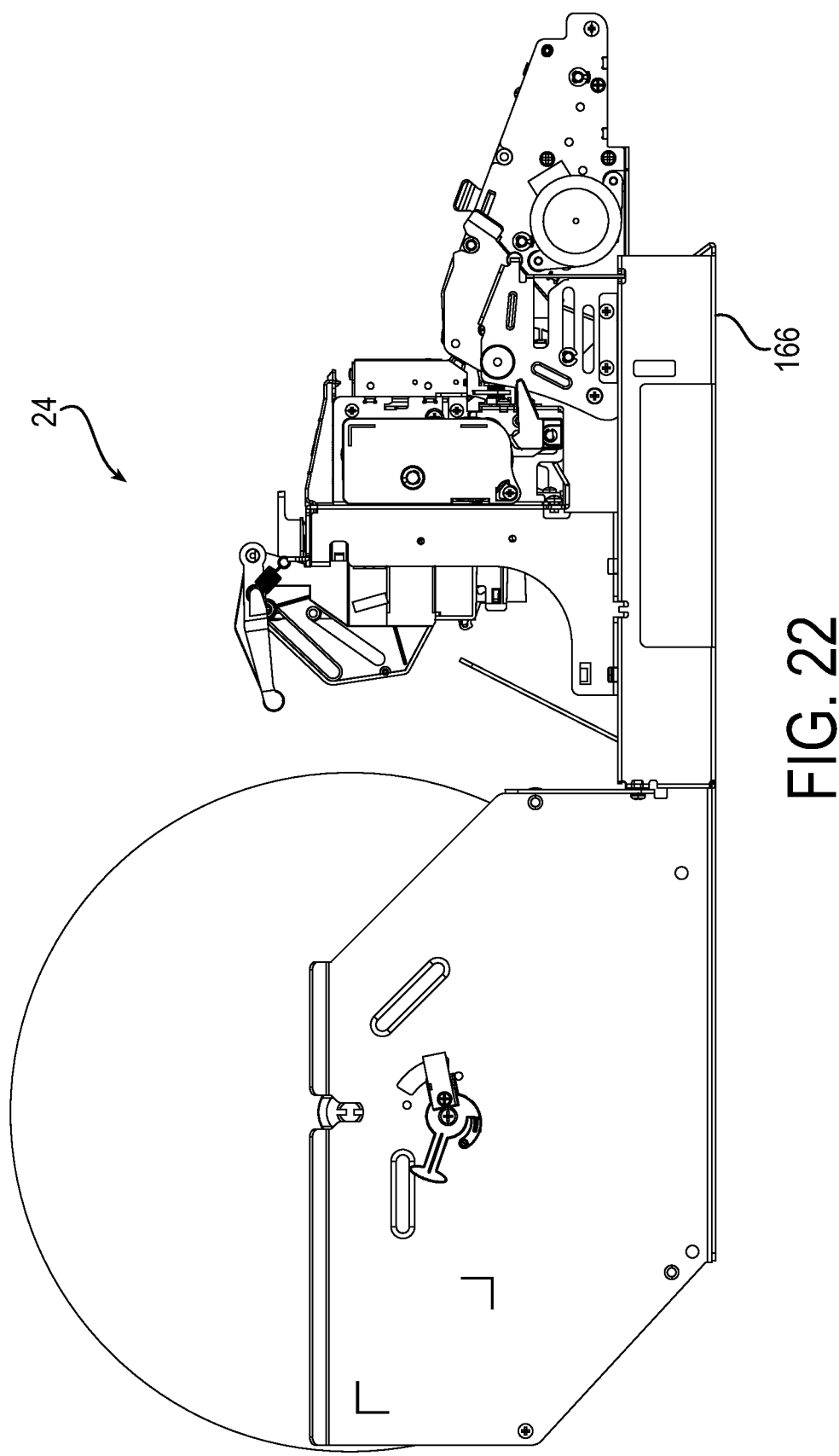
FIG. 22 is a left-side view of the receipt printer of the ATM.

As shown in FIG. 19, the inlet 94 of the check receiver 58 is below the lateral side 86 and directly below the rear side 84. A vertical, dashed line is shown in FIG. 19 extending downward from at least one point 87 on the rear side 84 that is closer to the rearward-least lateral side 86 than a rearward-most side (the "top" edge of the display referenced at 85 in FIG. 1) and intersecting a portion of the check receiver 58 referenced at inlet 94. The dashed line represents a second vertical plane that extends parallel to the lateral horizontal axis 72 and to the longitudinal vertical axis 78. The exemplary second vertical plane thus extends through the second bezel 118, the check receiver 58, and the lateral side 86. FIG. 19 also shows that in the exemplary embodiment of the present disclosure the inlet 94 of the check receiver 58 is directly below the lateral side 86 when the fascia 54 is in the first position. As shown in FIG. 19, a second longitudinal horizontal axis 89 extends parallel to the first longitudinal horizontal axis 62, is spaced from the first longitudinal horizontal axis 62 along the longitudinal vertical axis 78, and passes through the display 14 and also through at least a portion of the check reader portion 128. FIG. 19 also shows the check receiver 58 defines a third height 91 along the longitudinal vertical axis 78 between a bottom in a first plane normal 93 to the longitudinal vertical axis 78 and a second plane 95 normal to the longitudinal vertical axis 78 and wherein most of the third height 91 is directly behind the display 14 along the longitudinal vertical axis 78. A line referenced at 97 in FIG. 19 indicates a plane that contains a bottom-most edge of the lateral side 86 of the display 14. As shown in FIG. 19, the plane 97 is closer to the first plane 93 than the second plane 95, thus most of the third height 91 is directly behind the display 14 along the longitudinal vertical axis 78.

The ATM 10 can also include a third bezel 156 defining a passageway 158 for a receipt and mounted in the fascia 54. The passageway 158 can extend between an inlet 160 and an outlet 162. The inlet 160 of the first bezel 70 can be aligned with the outlet 92 of the receipt printer 24 when the fascia 54 is in the first position.

Figure 23:
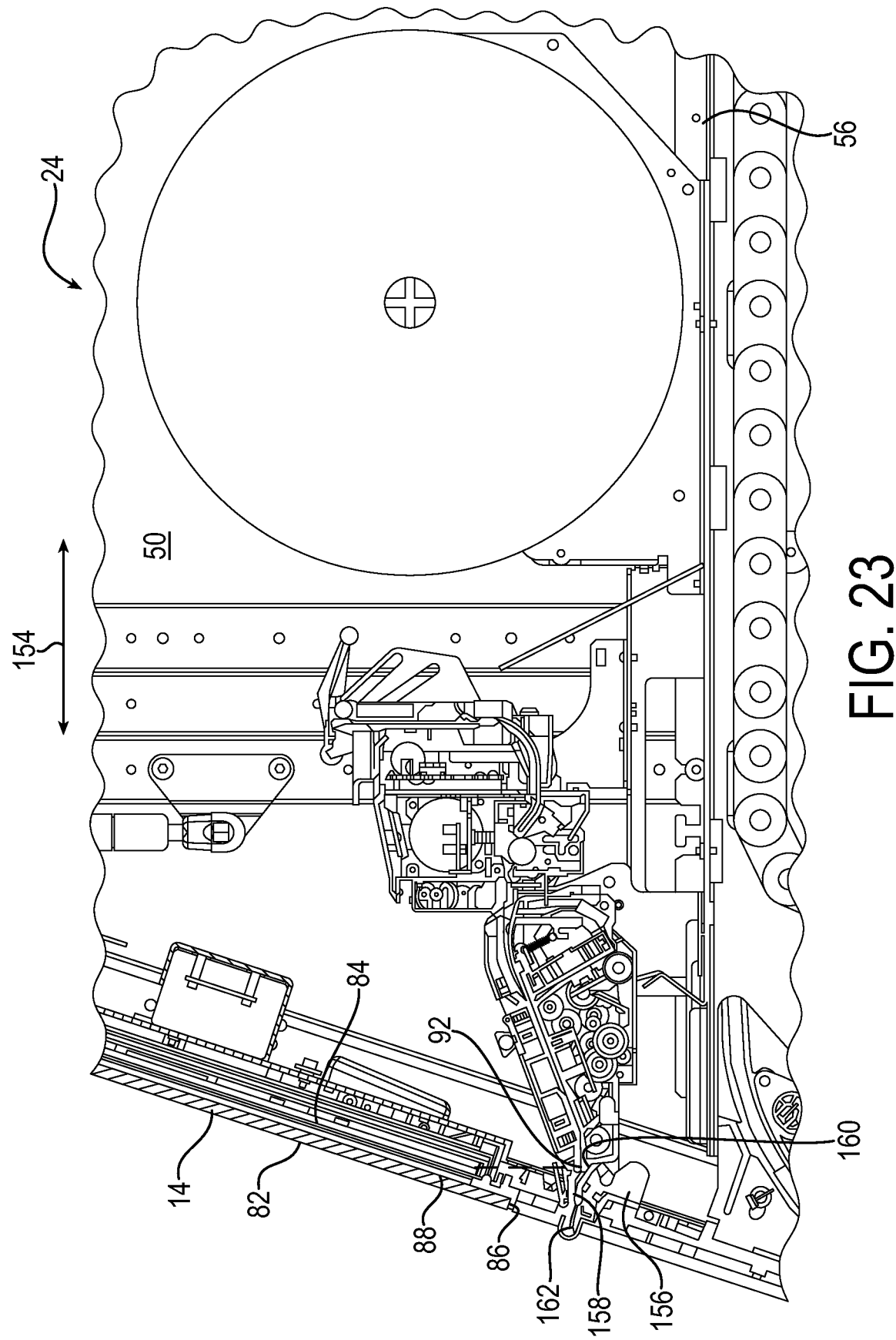
FIG. 23 is a cross-sectional view of the receipt printer positioned in the ATM with the fascia closed, taken in a plane referenced by section lines 23-23 in FIG. 4.

As shown in FIG. 23, the receipt printer 24 is directly below the lateral side 86. A vertical, dashed line is shown in FIG. 23 extending downward from at least one point on the rearward-least lateral side 86 and intersecting a portion of the receipt printer 24. The dashed line represents a third vertical plane that extends parallel to the lateral horizontal axis 72 and to the longitudinal vertical axis 78. The exemplary third vertical plane thus extends through the third bezel 156, the receipt printer 24, and the lateral side 86. In FIG. 23, the axis referenced at 154 is parallel to and laterally-spaced from the longitudinal horizontal axis 62. FIG. 23 also shows that in the exemplary embodiment of the present disclosure the inlet of the receipt printer 24 is directly below the lateral side 86 when the fascia 54 is in the first position.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. An automated transaction machine (ATM) comprising:
   a housing defining a depth between a forward side and an aft side, a width between a right side and a left side, and a height between a bottom edge and a top edge;
   a display mounted to said housing and directed toward an exterior of said housing;
   a cash recycler configured to receive a first note of currency from a first user of said ATM and dispense the first note of currency to a subsequent, second user of said ATM;
   a check receiver positioned in said housing, said check receiver having an intake portion with an inlet communicating with the exterior of said housing, said check receiver also having a check reader portion configured to receive a check from said intake portion, scan data displayed on the check, and store the check, wherein said intake portion is positioned below said display and said check reader portion is positioned behind said display;
   a tray mounted in said housing, said check receiver positioned on said tray;
   a card reader having an inlet and positioned on said tray;
   first and second telescopic tracks interconnecting said tray and said housing, wherein said check receiver and said card reader are moveable in and out of said housing on said tray;
   a fascia mounted to said housing for pivoting movement about a pivot axis, said fascia moveable between a first position in which said fascia cooperates with said housing to enclose said tray and said check receiver and said card reader and a second position pivotally spaced from said first position, wherein said check receiver and said card reader can be pulled out of said housing while supported on said first and second telescopic tracks when said fascia is in said second position;
   third and fourth telescopic tracks interconnecting at least part of said cash recycler and said housing, wherein said at least part of said cash recycler is moveable in and out of said housing;
   a first bezel defining a passageway for a card and mounted in said fascia, said passageway extending between an inlet and an outlet, said outlet of said first bezel aligning with said inlet of said card reader when said fascia is in said first position, wherein one of said first bezel and said card reader further comprises at least one first bar extending parallel to and spaced from said inlet of said card reader when said fascia is in said first position and the other of said first bezel and said card reader further comprises at least one first latch at least partially surrounding said at least one first bar when said fascia is in said first position, and wherein said at least one first bar and said at least one first latch come into engagement with one another as said fascia is moving to said first position from said second position and wherein said at least one first bar and said at least one first latch cooperate to lift said card reader while coming into engagement with one another; and
   a second bezel defining a passageway for a check and mounted in said fascia, said passageway extending between an inlet and an outlet, said outlet of said second bezel aligning with said inlet of said check receiver when said fascia is in said first position, wherein one of said second bezel and said check receiver further comprises at least one second bar extending parallel to and spaced from said inlet of said check receiver when said fascia is in said first position and the other of said second bezel and said check receiver further comprises at least one second latch at least partially surrounding said at least one second bar when said fascia is in said first position, and wherein said at least one second bar and said at least one second latch come into engagement with one another as said fascia is moving to said first position from said second position and wherein said at least one second bar and said at least one second latch cooperate to pivot at least a portion of said check receiver relative to said tray while coming into engagement with one another,
   wherein said at least one first bar and said at least one first latch engage one another at a first height elevated from said tray when said fascia is in said first position, said at least one second bar and said at least one second latch engage one another at a second height elevated from said tray when said fascia is in said first position, and said first height and said second height are different from one another.

2. The ATM of claim 1 wherein said display is mounted in said fascia and thereby moveable with said fascia as said fascia moves between said first position and said second position, said display further comprising a display side through which information is displayed, a rear side opposite to said display side, and a plurality of lateral sides extending between said display side and said rear side, wherein at least one of said card reader and said intake portion of said check receiver is directly below said rear side of said display when said fascia is in said first position.

3. The ATM of claim 2 wherein at least part of both of said card reader and said intake portion of said check receiver are both directly below said read side of said display when said fascia is in said first position.

4. The ATM of claim 1 wherein said first and second telescopic tracks are below said card reader and said check receiver and wherein said first and second telescopic tracks and said third and fourth telescopic tracks are horizontally adjacent to said cash recycler.

5. An automated transaction machine (ATM) comprising:
a housing defining a depth between a forward side and an aft side, a width between a right side and a left side, and a height between a bottom edge and a top edge;
a display mounted to said housing and directed toward an exterior of said housing;
a cash recycler configured to receive a first note of currency from a first user of said ATM and dispense the first note of currency to a subsequent, second user of said ATM;
a check receiver positioned in said housing, said check receiver having an intake portion with an inlet communicating with the exterior of said housing, said check receiver also having a check reader portion configured to receive a check from said intake portion, scan data displayed on the check, and store the check, wherein said intake portion is positioned below said display and said check reader portion is positioned behind said display;
a tray mounted in said housing;
a card reader having an inlet and positioned on said tray;
a receipt printer having an outlet and positioned on said tray;
a fascia mounted to said housing for pivoting movement about a pivot axis, said fascia moveable between a first position in which said fascia cooperates with said housing to enclose said tray, said card reader, said check receiver and said receipt printer and a second position pivotally spaced from said first position wherein said tray can be pulled out of said housing while supported on said first and second telescopic tracks when said fascia is in said second position;
first and second telescopic tracks interconnecting said tray and said housing, wherein said card reader, said check receiver and said receipt printer are jointly moveable in and out of said housing on said tray;
a first bezel defining a passageway for a card and mounted in said fascia, said passageway extending between an inlet and an outlet, said outlet of said first bezel aligning with said inlet of said card reader when said fascia is in said first position, wherein one of said first bezel and said card reader further comprises at least one first bar extending parallel to and spaced from said inlet of said card reader when said fascia is in said first position and the other of said first bezel and said card reader further comprises at least one first latch at least partially surrounding said at least one first bar when said fascia is in said first position, and wherein said at least one first bar and said at least one first latch come into engagement with one another as said fascia is moving to said first position from said second position and wherein said at least one first bar and said at least one first latch cooperate to lift said card reader while coming into engagement with one another; and
a second bezel defining a passageway for a check and mounted in said fascia, said passageway extending between an inlet and an outlet, said outlet of said second bezel aligning with said inlet of said check receiver when said fascia is in said first position, wherein one of said second bezel and said check receiver further comprises at least one second bar extending parallel to and spaced from said inlet of said check receiver when said fascia is in said first position and the other of said second bezel and said check receiver further comprises at least one second latch at least partially surrounding said at least one second bar when said fascia is in said first position, and wherein said at least one second bar and said at least one second latch come into engagement with one another as said fascia is moving to said first position from said second position and wherein said at least one second bar and said at least one second latch cooperate to pivot at least a portion of said check receiver relative to said tray while coming into engagement with one another,
wherein said at least one first bar and said at least one first latch engage one another at a first height elevated from said tray when said fascia is in said first position, said at least one second bar and said at least one second latch engage one another at a second height elevated from said tray when said fascia is in said first position, and said first height and said second height are different from one another.

6. The ATM of claim 5 wherein at least one of said card reader, said check receiver, and said receipt printer includes a downwardly-facing surface that contacts an upwardly-facing surface defined by said tray and that extends laterally beyond a lateral edge of said upwardly-facing surface.

7. The ATM of claim 6 wherein at least two of said card reader, said check receiver, and said receipt printer extend laterally beyond said upwardly-facing surface defined by said tray and upon which said card reader, said check receiver, and said receipt printer rest.

8. The ATM of claim 7 further comprising:
a third bezel defining a passageway for a receipt and mounted in said fascia, said passageway of said third bezel extending between an inlet and an outlet, said inlet of said third bezel aligning with said outlet of said receipt printer when said fascia is in said first position, wherein a third vertical plane extends through said third bezel and said card reader and said lateral side of said plurality of lateral sides of said display that is rearward-least among said plurality of lateral sides,
wherein a first vertical plane extends through said first bezel and said card reader and said lateral side of said plurality of lateral sides of said display that is rearward-least among said plurality of lateral sides, and
wherein a second vertical plane extends through said second bezel and said check receiver and said lateral side of said plurality of lateral sides of said display that is rearward-least among said plurality of lateral sides.

* * * * *